US008211359B2

(12) United States Patent
Beane

(10) Patent No.: US 8,211,359 B2
(45) Date of Patent: Jul. 3, 2012

(54) METHOD, SYSTEM, AND COMPUTER PROGRAM FOR CONTROLLING A HYDRAULIC PRESS

(76) Inventor: Glenn L. Beane, Hanover, NH (US)

( * ) Notice: Subject to any disclaimer, the term of this patent is extended or adjusted under 35 U.S.C. 154(b) by 2072 days.

(21) Appl. No.: 10/719,975

(22) Filed: Nov. 21, 2003

(65) Prior Publication Data

US 2008/0145466 A1 Jun. 19, 2008

Related U.S. Application Data

(63) Continuation-in-part of application No. 09/711,981, filed on Nov. 14, 2000, now abandoned, which is a continuation-in-part of application No. 09/503,543, filed on Feb. 14, 2000, now abandoned.

(60) Provisional application No. 60/146,422, filed on Jul. 29, 1999.

(51) Int. Cl.
*B22F 3/02* (2006.01)
*B29C 45/76* (2006.01)

(52) U.S. Cl. .......... 419/66; 264/40.3; 264/40.5; 425/78; 425/149; 425/344; 425/345

(58) Field of Classification Search .................... 419/66; 425/78, 149, 344, 345; 264/40.3, 40.5
See application file for complete search history.

(56) References Cited

U.S. PATENT DOCUMENTS

| | | | | | |
|---|---|---|---|---|---|
| 3,659,985 | A | * | 5/1972 | Marshall et al. | 425/78 |
| 3,687,586 | A | * | 8/1972 | Hara et al. | 425/78 |
| 3,758,245 | A | * | 9/1973 | Hermes | 425/78 |
| 5,885,625 | A | * | 3/1999 | Beane et al. | 425/260 |
| 5,897,826 | A | * | 4/1999 | Lashmore et al. | 264/437 |
| 5,906,837 | A | * | 5/1999 | Link et al. | 425/78 |
| 5,989,487 | A | * | 11/1999 | Yoo et al. | 266/249 |

* cited by examiner

*Primary Examiner* — Roy King
*Assistant Examiner* — Ngoclan T Mai
(74) *Attorney, Agent, or Firm* — Devine, Millimet & Branch; Paul C. Remus

(57) ABSTRACT

A method, control system, computer program, and article of manufacture for controlling hydraulic press systems, and a new press system that utilizes a number of improvements over the assignee's original system. The control system is designed to control a hydraulic press having a die, at least two separate sets of workpiece forming punches, and at least two hydraulic pistons, each operatively associated with one set of workpiece-forming punches. The control system includes a means for controlling a magnitude of a pressing force applied by each set of workpiece-forming punches, and a means for controlling a position of each set of workpiece-forming punches relative to the die.

12 Claims, 14 Drawing Sheets

METHOD, SYSTEM, AND COMPUTER PROGRAM FOR CONTROLLING A HYDRAULIC PRESS

RELATED APPLICATIONS

This application is a Continuation-in-Part of U.S. patent application Ser. No. 09/711,981, filed on Nov. 14, 2000 now abandoned, which is a Continuation-in-Part of abandoned U.S. patent application Ser. No. 09/503,543 filed on Feb. 14, 2000, which claims the benefit of Provisional Patent Application No. 60/146,422 filed on Jul. 29, 1999.

FIELD OF THE INVENTION

This invention relates to the control of a manufacturing system for forming a workpiece from materials and, in particular, the control of a manufacturing system that comprises an independent power source and at least one manufacturing assembly associated therewith.

BACKGROUND OF THE INVENTION

In the field of powder metallurgy, fine metal powders are compressed into the form of a workpiece in a die under high pressure. The procedure is typically carried out in huge oversized machines referred to as powder presses. In these presses, pressure is applied to the metal powder by at least one movable punch. The pressure applied to the workpiece by way of the punch, or punches, can be applied, for example, mechanically or through the use of hydraulic rams.

An example of a powder press using a hydraulic ram is shown in U.S. Pat. No. 3,788,787 to Silbereisen et al. The Silbereisen press is a powder press having a vertical orientation and upper and lower hydraulic cylinder assemblies. The upper hydraulic cylinder assembly is connected to a massive cross head, or plated. A press punch is in turn connected to the crosshead and moves downwardly into a mold cavity in the die. This action pressed the metal powder within the die to form a compressed solid workpiece having the desired height and shape. A lower punch is fixed relative to the frame.

The Silbereisen Press is representative of powder presses presently known in the art in that 1) it is designed to accommodate a variety of different workpieces by allowing for interchangeability of the tool matrix or die; 2) the distance the ram(s) travels or "stroke" is relatively fixed and, hence, it is not possible to control the position of one punch relative to another within the die; and 3) it is not possible to control a pressing force exerted by each punch to adjust for differences in punch sizes or part geometries.

In this "generic" press it is necessary to compensate for the "fixed" stroke by adapting the tool and die and appropriately connecting them to the ram(s) in order to produce a given part or workpiece. Such adaptation typically involves large structure and results in large distances between the source of force moving the ram and the actual part being produced. These large distances then translate into inaccuracies in alignment between the punches when they reach the die to form the workpiece. In addition, the powder from which the workpiece is formed is conventionally introduced to the die by a powder feed shoe that allows powder to fall gravitationally into the open upper end of the die as the feed shoe travels across the die. As the powder is compressed by the punches, density gradations in the powder create shear forces within the powder. To contain the shear forces, and other forces created by misalignment of the punches, conventional presses rely on large overall size and weight and on massive moving platens to maintain proper alignment during operation. In particular, the platens of conventional presses, and the frame members holding and guiding the platens, are also very large and very heavy in order to maintain proper alignment of the punches and the die. Because of the tremendous forces employed in the press, any misalignment can cause catastrophic failure of the press. As a result of all this required additional structure, presses of this type typically stand greater than 20 feet high and weigh more than 50 tons.

Further contributing to the massive size of conventional presses is the use of an integrated energy source. That is, each press has its own built in energy source that typically is very large considering the amount of energy needed to press a workpiece. A commercially available hydraulic automatic press known as the TPA H manufactured by Dorst Maschen and Anlagebau readily illustrates the massive size of these conventional presses. The TPA H press provides, at the lower end of the press, a first hydraulic cylinder fixed relative to the frame of the press and having a first piston that moves vertically within the first hydraulic cylinder. A second piston moves vertically within the first piston such that the first piston acts as a second hydraulic cylinder within which the second piston operates. The TPA H press also provides an upper hydraulic cylinder fixed relative to the frame of the press. The upper hydraulic cylinder has an upper piston that moves vertically relative to the upper hydraulic cylinder. Similarly to those of other conventional presses, the punches used with the TPA H press are spatially separate from the various hydraulic pistons and are held in position by large platens. Hence, this press has, as is typical with other conventional presses, a source of energy for moving the punches at a remote location from the energy, or force, receiving end of the punch. This press also has a large external frame to compensate for the shear forces on the powder and the misalignment of the punches due to large travel distances.

In order to overcome the drawbacks of conventional presses, the assignee of the present invention developed the "Hydraulic Modular Manufacturing System" described and claimed in the Related Applications referenced above. These applications describe and claim a press, press system and method for performing the pressing function of conventional presses such as powder, stamping, die casting, injection molding, etc., while, at the same time, allowing the use of a substantially smaller, lighter, portable and less expensive apparatus than conventional presses and manufacturing systems.

The manufacturing modules used in the assignee's system can be less than $1/10^{th}$ the size of a conventional press. Because of its relatively small size, each manufacturing module can be manufactured to produce one specific workpiece, effectively reducing down times required to set-up conventional presses. Further, each manufacturing system can have manufacturing modules that are remote from independent power sources. This allows a number of modules to be attached to one power source, greatly conserving resources and space. The greatly reduced size, weight and complexity of a press of the present invention allows a manufacturing system to take up much less physical space than multiple conventional free standing integrated presses.

In some embodiments of the assignee's system, standard sets of presses, of sizes ranging from 120-2100 tons, may be manufactured to accept interchangeable tooling. In these systems, one hydraulic system is typically utilized per press, allowing for fast strokes for most piston motions. However, these systems still utilize a docking station where the presses are exchanged, but each docking station, or "work cell", would have its own "independent" hydraulic system.

The assignee's press system typically includes a plurality of punches, which are preferably monolithic devices that include a work pressing end and a force-receiving end, although in some embodiments interchangeable work pressing attachments are provided at the workpiece-forming end of the punch. Because each of these punches is preferably connected to a source of hydraulic fluid, it was recognized that the force exerted by, and the position of, each of the punches may be independently controlled, either manually or via a computer. However, the unique nature of the assignee's press system created a need for a way to effectively use this ability to independently control the pressing force and punch position and to do so in a repeatable and readily adjustable manner. Further, there is a need for a way to accurately dispense precise amounts of powder in to the dies of this system. These needs are addressed by the method, control system, computer program means and article of manufacture described and claimed herein.

SUMMARY OF THE INVENTION

The present invention is a method, control system, computer program, and article of manufacture for controlling hydraulic press systems, and a new press system that utilizes a number of improvements over the assignee's original system. The control system of the present invention is designed to control a hydraulic press having a die, at least two separate sets of workpiece forming punches, and at least two hydraulic pistons, each operatively associated with one set of workpiece-forming punches. In its most basic form, the control system includes a means for controlling a magnitude of a pressing force applied by each set of workpiece-forming punches, and a means for controlling a position of each set of workpiece-forming punches relative to the die.

In some embodiments of the control system, the means for controlling a magnitude of a pressing force applied by each set of workpiece-forming punches includes at least two pressure sensors in fluid communication with a fluid provided to each piston for measuring a pressure of the fluid provided to each side of the piston. An adjustable hydraulic valve is provided for adjusting a pressure of the fluid provided to each piston and at least one controller is in communication with each valve. In the preferred embodiment of the control system, the controller is placed in communication with each pressure sensor and with a computer. The computer preferably includes a processor and a memory onto which is stored a computer program having computer program means for sending information to the controller relating to the desired pressure to be applied by each of the workpiece forming punches. The controller then accepts an input from each pressure sensor, compares the pressure of the fluid provided to each piston to a pressure corresponding to a desired pressing force, determines how to adjust the pressure of to each piston such that the pressure corresponds to a desired pressing force, and sends an output to each adjustable hydraulic valve to adjust the pressure of the fluid provided to each piston. In some embodiments, the computer program means sends information to the controller to allow the controller to adjust the pressure of the fluid provided to each piston such that the workpiece-forming punches form a workpiece having a substantially uniform density.

In some embodiments of the system, the means for controlling a position of each set of workpiece-forming punches relative to the die includes at least one position sensor disposed relative to the each set of workpiece-forming punches such that a position of each set of workpiece-forming punches may be determined, at least one fluid valve for controlling a flow of a fluid provided to and extracted from each piston, and at least one controller in communication with each fluid valve for controlling the flow of fluid provided to each piston. In the preferred control system the controller is in communication with each position sensor and with a computer. The computer preferably includes a processor and a memory onto which is stored a computer program having computer program means for sending information to the controller relating to the desired position of the workpiece forming punches. The controller then accepts an input from each position sensor, compares a position of each set of workpiece-forming punches to a desired position, determines how to adjust the position of each piston, and sends an output to each fluid valve to control a flow of the fluid provided to each piston.

The preferred control system is adapted to control a hydraulic powder press, and also includes a means for controlling an introduction of a powder material into the die. In some embodiments of this system, the means for controlling an introduction of a powder material into the die includes a means for controlling a weight of the powder material introduced into the die. This means preferably includes at least one weight scale, at least one hopper containing a powder material, at least one hopper valve for controlling a flow of the powder material from the hopper to the weight scale, and at least one controller in communication with each hopper valve for controlling a position of the hopper valve. In the preferred embodiment, a computer is placed in communication with each weight scale and each controller. The computer preferably includes a processor and a memory onto which is stored a computer program made up of a computer program means for accepting an input from each weight scale corresponding to a weight of a powder material, computer program means for comparing the weight of the powder material with a desired weight, computer program means for determining how to adjust a position of each hopper valve based upon a result of the comparison between the weight of the powder material and the desired weight, and computer program means for sending an output to each hopper valve to control a flow of the powder material provided to each weight scale.

In other embodiments, the means for controlling an introduction of a powder material into the die comprises a means for controlling a temperature of the powder material. This means for controlling the temperature of the powder material introduced into the die preferably includes at least one heating element for heating the powder material, at least one temperature sensor for sensing a temperature of the powder material, and at least one temperature controller for controlling a temperature of the powder material. It is also preferred that a computer be placed in communication with each temperature sensor and each temperature controller. The preferred computer comprises a processor and a memory onto which is stored a computer program that includes computer program means for accepting an input from the temperature sensor corresponding to a temperature of the powder material, computer program means for comparing the temperature of the powder material with a desired temperature, computer program means for determining how to adjust the temperature of the powder material based upon a result of the comparison between the temperature of the powder material and the desired temperature, and computer program means for sending an output to each heating element to control the temperature of the powder material.

In other embodiments, the means for controlling an introduction of a powder material into the die includes a means for controlling a creation of a substantially uniform distribution of powder material in the die. The means for controlling a creation of a substantially uniform distribution of powder material in the die is preferably a means for controlling a fluidization of the powder material within the die. The preferred means for controlling a fluidization of the powder material within the die includes a pressurized air input, an electronic pressure regulator, a poppet valve, and a branch connection that connects the air input and the powder input with the die cavity. In operation, the poppet valve is closed to shut off the flow of air into the branch connector and a valve is opened allowing powder to flow from the powder input through the branch connector and into the system. Once the powder is introduced, the valve is closed to seal the powder input from the system, and the poppet valve is opened allowing pressurized air is to enter the branch connector and flow into the die cavity, where the powder is disposed. This pressurized air is then cycled, or pulsed, by the pressure regulator and poppet valve, which causes the powder to be fluidized within the die. In some such embodiments, the system includes a heater and temperature feedback controls for heating the pressurized gas such that the hot gas both fluidizes and heats the powder within the die.

The preferred control system also includes a means for controlling a lubrication of the die cavity. The preferred means for controlling the lubrication of the die cavity includes a source of a lubricant, a lubricant fill valve attached to the source of lubricant such that a flow of lubricant from the source may be controlled, a lubricant drain valve attached to the die such that a flow of lubricant from the die may be controlled, and a means for controlling the filling of, and draining of the lubricant from, the die. The means for controlling the filling of, and draining of the lubricant from, the die preferably includes a computer having a processor and a memory onto which is stored a computer program that includes computer program means for sending an output to the means for controlling a position of each set of workpiece-forming punches to move each set of workpiece-forming punches such that an enclosed die cavity is formed, computer program means for controlling the lubricant fill valve such that the lubricant is introduced into the die, computer program means for controlling the lubricant drain valve to drain the lubricant from the die, and computer program means for controlling an air purge of lubricant from the die.

In its most basic form, the method of the present invention includes the steps of controlling an introduction of a powder material into a die, controlling a creation of a substantially uniform distribution of powder material in the die, and controlling a pressing of the powder material in the die by controlling a magnitude of a pressing force applied by each of at least one set of workpiece-forming punches and by controlling a position of each set of workpiece-forming punches relative to the die.

In the preferred method, the step of controlling an introduction of the powder material comprises the step of controlling a weight and temperature of the powder material introduced into the die. The step of controlling the weight of the powder material introduced into the die preferably includes the steps of controlling a weight of a first powder material to be introduced into the die and controlling a weight of a second powder material to be introduced into the die. In some embodiments, multiple scales are use to control the weights of these materials. In others, a single scale is used. In the preferred method, the step of controlling a creation of a substantially uniform distribution of powder material in the die comprises controlling a fluidization of the powder material within the die.

The preferred step of controlling pressing of the powder material in the die by controlling a magnitude of a pressing force applied by each set of workpiece-forming punches includes the step of controlling a pressure of a fluid provided to each of at least one piston that is operatively associated with each set of workpiece-forming punches. This step of controlling the pressure preferably includes the steps of determining a pressure of a fluid provided to each of at least one piston that is operatively associated with each set of workpiece-forming punches, comparing the pressure of the fluid provided to each piston to a pressure corresponding to a desired pressing force, and adjusting the pressure of the fluid provided to each piston based upon a result of the comparing step. In some embodiments, the step of adjusting the pressure of the fluid provided to each piston includes adjusting the pressure of the fluid provided to each piston such that the workpiece-forming punches form a workpiece having a substantially uniform density. It is noted that, for purposes of this application, the reading of piston pressure is the reading of the difference in pressure between fluid on one side of the piston and fluid on the other. Accordingly, pressure is actually relative pressure across the piston rather than the absolute pressure at either side.

The preferred step of controlling the pressing of the powder material in the die by controlling a position of each set of workpiece-forming punches relative to the die includes the steps of determining a position of each set of workpiece-forming punches, comparing the position of each set of workpiece-forming punches to a desired position, and adjusting a rate of travel of each set of workpiece-forming punches based upon a result of the comparing step. This step preferably also includes the steps of controlling a position of a first set of workpiece-forming punches moving in a first direction relative to the die, and controlling a second set of workpiece forming punches moving in a second direction relative to the die. However, in some embodiments both sets of punches move in the same direction, but at different speeds, and therefore the application should not be seen as being so limited.

The preferred method also includes the step of controlling a lubrication of the die cavity prior to controlling the introduction of powder material into the die. This step preferably includes the steps of creating an enclosed die cavity, introducing a lubricant into the die cavity, and draining the lubricant from the die cavity.

It is envisioned that the computer program means described in connection with the control system, and adapted for performing the steps of the method, will be sold as a separate press control program product. In the preferred embodiment, the computer program product is adapted to allow a single computer to perform all of the control functions described herein and to perform these functions for a single press. However, in some embodiments, the computer program product is adapted to perform these functions for multiple presses running concurrently.

It is likewise envisioned that articles of manufacture, taking the form of data storage media onto which the relevant data structures are stored, will be sold for each part that is to be manufactured using the press system. Accordingly, in instances where different parts may be manufactured using the same die, or where die cavities may be interchanged in a given press system, different data structures may be readily inputted into the system to assist in the control of the system for each of the desired parts to be manufactured.

Finally, the present invention includes a number of improvements to the press system itself, including the use of the same pressurized gas to both fluidize and heat powder, the heating of the die itself to heat powder with concurrent cooling of the hydraulic pistons, and the separation of the first set of punches from the second set, allowing for enlarged die openings to accommodate large parts.

BRIEF DESCRIPTION OF THE DRAWINGS

The foregoing and further objects, features and advantages of the present invention will be described in or be apparent from the following description of embodiments, with reference to the accompanying drawings, where like numerals are used to represent like elements and wherein.

DETAILED DESCRIPTION OF PREFERRED EMBODIMENTS

Figure 1:
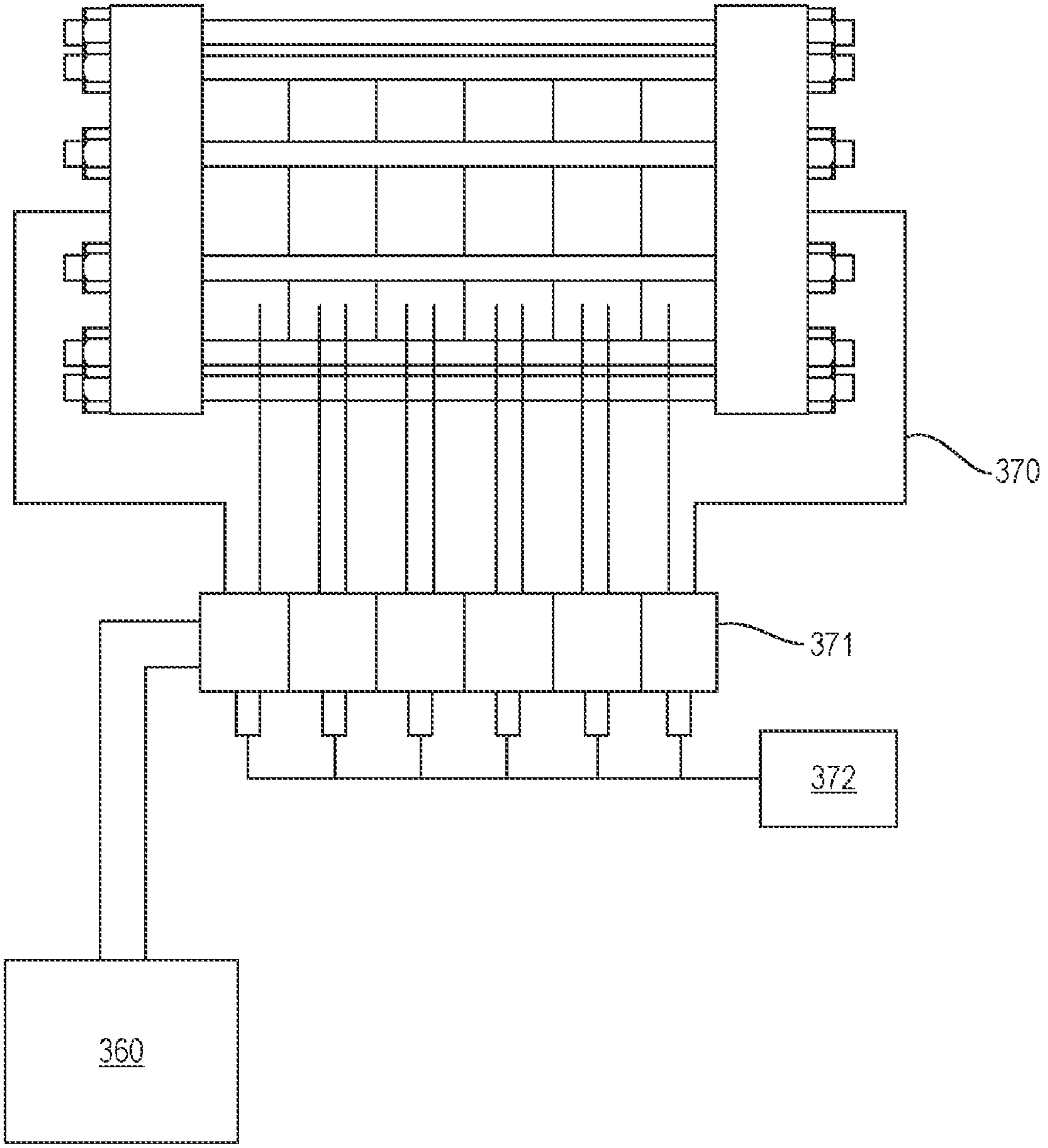
FIG. 1 is a schematic view of one embodiment of a pressing assembly controlled by the present invention.

The method, control system and computer program of the present invention are readily adapted for use with powder press manufacturing systems, such as those described in the applicants' co-pending U.S. patent application Ser. No. 09/711,981, which is incorporated herein by reference. These systems typically include an independent power source and at least one pressing module remotely associated therewith. Each pressing module comprises at least one punch having an end for pressing a powder material to form a workpiece. At least one punch is operatively associated with a first end of a piston having a second force-receiving end. In one embodiment, the punch that is operatively associated with the first end of the piston is removable therefrom. Alternatively, the punch that is operatively associated with the first end of the piston may comprise a single monolithic part.

The pressing system typically includes at least one force-applying assembly configured to apply pressing force directly to the force-receiving end. Each force-applying assembly is preferably axially fixed relative to a frame so that it cannot move along the axis of the punch. Some or all of the force-applying assembly can be, for example, a hydraulic force-applying assembly, a pneumatic assembly or mechanical force-applying assembly. In a particularly preferred embodiment, the force-applying assembly of the pressing module is a hydraulic assembly.

Each pressing module is operatively and reciprocally connected to, and receives power from, the independent power source. The pressing module further includes a die to receive and contain the powder, from which the workpiece is formed. The material from which the workpiece is formed when using the powder pressing module can be, for example, metal powders, ceramic powders, other powders, flakes, fibers or sheets of ceramics, polymers, carbides, cements, or the like. For ease of reference throughout the specification and claims, such materials are generically referred to as "powders." The die has an opening positioned to receive the end of the punch. The pressing module may also include means for delivering powder into the die and creating a substantially uniform distribution of powder in the die. Preferably, the means for creating a substantially uniform distribution is a powder fluidizing apparatus.

Preferably, the manufacturing system controlled by the present invention includes a plurality of pressing modules remotely associated with the independent power source. There is at least one pressing station remotely connected to the power source, with each of the pressing modules being removably attached thereto.

The control system according to the present invention preferably controls each pressing module. The control system includes a means for controlling a magnitude of a pressing force applied by each set of workpiece-forming punches, and a means for controlling a position of each set of workpiece-forming punches relative to the die. The control system controls the distribution of power from the independent power source to each of the stations, preferably via a computer interface.

The manufacturing system can be operated wherein the control system controls the rate at which each piston moves towards the die so that at a point in time the force per unit area being applied to each said first surface of the workpiece is the same. Likewise the manufacturing system can be operated wherein the control system controls a rate at which each piston moves towards the die so that each piston reaches the surface of the workpiece at the same point in time. This also applies wherein the first piston moves toward and into the die until it moves a predetermined distance in the cylinder, a predetermined force is being applied to a first surface of the workpiece and/or until a mechanical stop is reached.

The manufacturing system can also include at least a second punch that extends in a second direction opposite that of the first punch and towards the die. This second punch can be fixed or alternatively it is operatively associated with a first end of a second piston having a second force-receiving end.

The punches are, in some embodiments, arranged so that the workpiece-forming ends of one or more punches are arranged to form the same side or alternatively, opposite sides of the workpiece. The long axes of the punches can be arranged horizontally, vertically or at any other angle relative to the horizon.

In an embodiment of the system for forming a workpiece, the press module has at least one piston cylinder having a piston slidable within it. The piston has a force-receiving end within the cylinder and a workpiece-forming end extending beyond the cylinder. In a typical powder presses the force-receiving end of the punch is attached to, or at least in contact with, any number of adapters before engaging the motive force produced by the press platen. Conversely, in the system controlled by the present invention, the force-receiving end directly engages a motive force for sliding the piston within the first piston cylinder. This sliding within the cylinder acts to generate a pressing force that is directly applied to the first surface of the workpiece.

The die is preferably annular but can be any shape appropriate to define the workpiece being formed. The die has a hole, which is positioned to receive the workpiece-forming end of or attachment on the piston. There may also be an opening in the die to receive the powder, although, in most embodiments, powder is introduced through the hole in the die for the punches or though a hole in the innermost concentric upper punch. One or more piston cylinders can be positioned on the same side or opposite sides of the die. Therefore, the workpiece-forming end of a particular piston can extend in the same direction, or in an opposite direction to the workpiece-forming ends of other pistons. Alternatively one of the pistons—the opposing one can be fixed, e.g. an anvil.

Another embodiment of the press module includes at least a second piston cylinder having a second piston reciprocally slidable within it. The second piston, like the first piston, has a force-receiving end located within the cylinder and a workpiece-forming end for forming a second surface of a workpiece. The workpiece-forming and extends beyond the cylinder. The force-receiving end directly engages a motive force for sliding the piston(s) within the second piston cylinder(s) to generate a pressing force to be applied to the first surface of the workpiece.

In some embodiments, a plurality of the piston cylinders are fixed relative to each other. Some of the ends of the pistons can extend beyond their respective cylinders in the same direction, for example to provide concentric punches, while others can extend in a direction opposite the direction in which second ends of other pistons extend beyond their respective cylinders in order to press the opposite side of the workpiece. Each piston cylinder and piston therein corresponds to a different level of the workpiece to be formed.

Some or all of the piston cylinders can be hydraulic cylinders with the pistons being hydraulically operated. In the case of some or all of the piston cylinders being hydraulic cylinders, the piston cylinders can share a common hydraulic fluid pressure source or can have hydraulic fluid sources with the same or different pressures. The hydraulic pressure of the hydraulic fluid delivered to each hydraulic piston may be individually controlled by separate valves. Further, the valves may be, for example, controlled by the control system.

Piston cylinders that are adjacent to each other can be in contact with and attached to each other. This helps enhance the compactness of the structure and permits individual parts to have multiple functions. For example, the end of a part defining a cavity of one piston cylinder may also define the head of an adjacent piston cylinder. Additionally, in preferred embodiments, the first piston within each succeeding first piston cylinder extends through and is axially movable along an inner peripheral surface defining a cylindrical void through a directly preceding first piston. Likewise, the second piston within each succeeding second piston cylinder extends through and is axially movable along an inner peripheral surface defining a cylindrical void through a directly preceding second piston.

FIG. 1 is a block diagram of one embodiment of the press system where the punches are hydraulic pistons and the cylinders are hydraulic cylinders in which the pistons operate. In such an embodiment, the hydraulic fluid for the various fluid passages and channels in the press of the present invention is pressurized, for example, by a pressure source 360. Hydraulic fluid lines 370 connect the pressure source 360 to the hydraulic fluid channels, the pressing hydraulic fluid passages, the retracting hydraulic fluid passages, the die ejection piston and the die ejection reservoir (not shown).

In a preferred embodiment, the pressure source 360 has a plurality of valves 371, one valve for each hydraulic fluid line 370. By selectively operating the valves 371 of the pressure source 360, the punches and a die ejection piston (not shown) can be selectively moved in either direction. In some embodiments, the valves 371 of the pressure source 360 are controlled by a microprocessor 372, such as those typically utilized in standard hydraulic numerical controllers (HNC), which forms part of the control system. For example, valves 371 may be controlled by one time/pressure curve such that each punch begins pressing at substantially the same time, stops pressing at substantially the same time and presses the powder with substantially the same pressure, even though different punches can have substantially different strokes. In these embodiments, the microprocessor controls the rate at which each piston slides within the cylinder so that at a given point in time, the force per unit area on each surface of the workpiece is the substantially the same. Alternatively, the valves 371 can be controlled so that each punch slides a predetermined distance into the cylinder, until a predetermined force is being applied to the respective first surface(s) and second surface(s) on the workpiece, or until a mechanical stop is reached within the piston cylinder.

Figure 2:
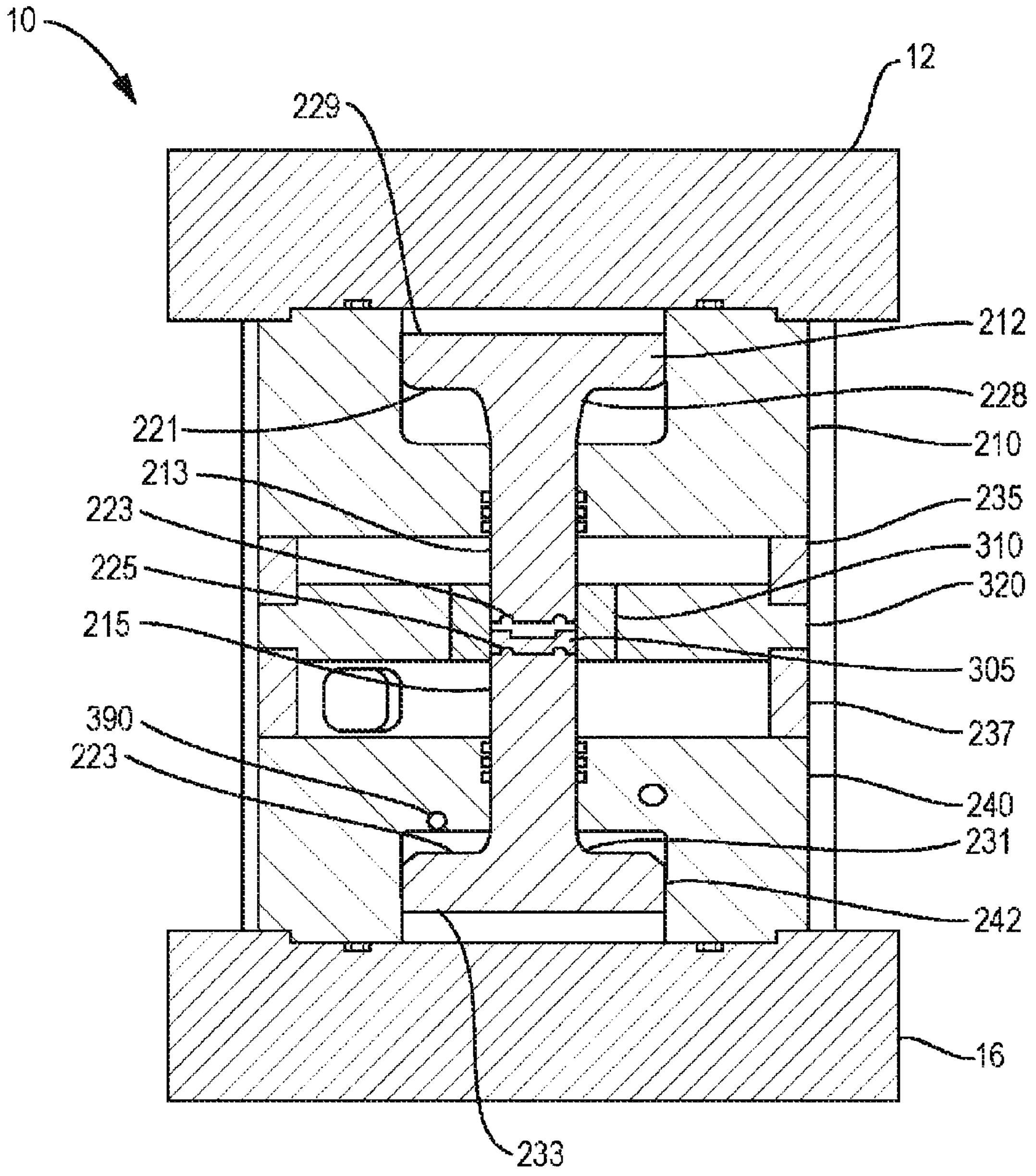
FIG. 2 is a sectional view of one embodiment of a press controlled by the present invention.

FIG. 2 shows an embodiment of the press where there is one first-piston cylinder 210. First piston 212 reciprocally operates within piston cylinder 210. First punch 213 for forming a first surface of a workpiece 205 is operatively associated with first piston 212. Similarly, there is one second-piston cylinder 240 wherein the second piston 242 operates. Second punch 215 for forming a second surface on the workpiece 205 is operatively associated with second piston 242. First punch 213 has workpiece-forming end 23 opposite to the portion 228 at which it associated with the piston 212 and similarly second punch 215 has workpiece-forming end 225 opposite to the portion 231 at which it associated with piston 242. Pistons 212 and 242 respectively have retraction surface 223 and 225 and force-receiving surfaces 229 and 233. First spacer cylinder 235 and second spacer cylinder 237 maintain piston cylinders 210 and 240 fixed relative to the die 310, in this embodiment fixed. Die holder cylinder 320 holds die 310 in a position to receive first workpiece-forming end 223 of first piston 212 and second workpiece-forming end 225 of second piston 242. First cylinder 210, first spacer cylinder 235, die holder cylinder 320, second cylinder 240 and second spacer cylinder 237 are held by frame 10 having first end plate 12 and second end plate 16. The first end plate 12 and second end plate 16 are held together by bolts (not shown).

In operation, starting from "fill", wherein a portion of first workpiece-forming end 223 of first punch 213 and a portion of second workpiece-forming end of second punch 215 each respectively sit inside die 310 thereby enclosing die 310 for containing powder material, powder material to make a workpiece is introduced into die 310 through a conduit (not shown) and preferably fluidized. Hydraulic fluid moves through first inlet (not shown) to act on first force-receiving end 229 of piston 212, sliding it within first piston cylinder 210 towards die 310. At the same time hydraulic fluid moves through second inlet (not shown) to act on second force-receiving end 233 of piston 242, sliding it in the direction of die 310. Powder (not shown) in die 310 is thereby compressed between the workpiece-forming end 223 of first punch 213 and the workpiece-forming end 225 of second punch 215. Second retraction surface 233 is acted upon by hydraulic fluid entering into second cylinder 240 through retraction inlet 390 thereby moving second piston 242 away from die 310. The workpiece formed is ejected by further application of hydraulic fluid on the force-receiving end 229 of piston 212 causing piston 212 to travel toward and through die 310 a distance that is approximately equal to the height of the workpiece thereby pushing the workpiece out of the die 310. As will be immediately appreciated, the process by which the press of the present invention presses and then ejects a workpiece can involve any number of the above operational steps in the same or different order or combination and the invention should therefore not be construed as limited only to the above.

In preferred embodiments of the invention, the introduction of the powder from which the workpiece is produced is controlled by fluidizing and/or pressurizing the powder to produce a substantially uniform density throughout the die during pressing. Examples of such powder fluidization and pressurization are shown in U.S. Pat. No. 5,885,625, issued on Mar. 23, 1999; U.S. Pat. No. 5,945,135 issued on Aug. 31, 1999 and U.S. Pat. No. 5,897,826 issued on Apr. 27, 1999, which are hereby incorporated in their entirety herein by reference. Using such filling techniques, a press can be operated with its major axis in the horizontal position, unlike conventional presses, which rely mainly on gravity for their fill. Additionally, because the density of the powder is uniform in the die, the press need not withstand the large shear stresses encountered with conventional presses, the number of parts of the press may be greatly reduced (for example, approximately 30 parts, other than seals, versus approximately 2000 parts in a conventional press). Also, the powder is isolated from the operating environment enabling the safe usage of a number of materials.

Due to the compact size and reduced number of parts, a press can be produced for a fraction of the cost of a conventional press. Moreover, since the power supply for a press of the present invention is independent and external to the press, it is highly portable and can be attached and detached to the power supply as needed. While the press has been described by using the example of a hydraulic press with concentrically positioned punches, it should be noted that other known force producing sources and other relative punch positions could be used. For example, mechanical pressing, pneumatic pressing piezoelectric or electromagnetism could be used to apply force to the punches. In addition, punches having workpiece-forming ends other than cylinders and having axes that are not concentric can be used.

The present invention is further directed to a method for controlling the forming a workpiece. The control system controls the following steps: introducing a powder material into a die, preferably creating a uniform density of powder in the die by fluidizing the powder in the die, and pressing the material in the die to a predetermined position at a predetermined, and preferably uniform, pressure.

The method can optionally further include controlling the pressing of the material in the die from a second direction opposite the first direction with a second set of at least one workpiece-forming. Like the first set of workpiece-forming punches, the material is pressed in the die by directly applying a motive force to the motive force-receiving end of each of the second set of at least one pistons(s) thereby sliding each within a second piston cylinder in a first direction towards the die.

Figure 3:
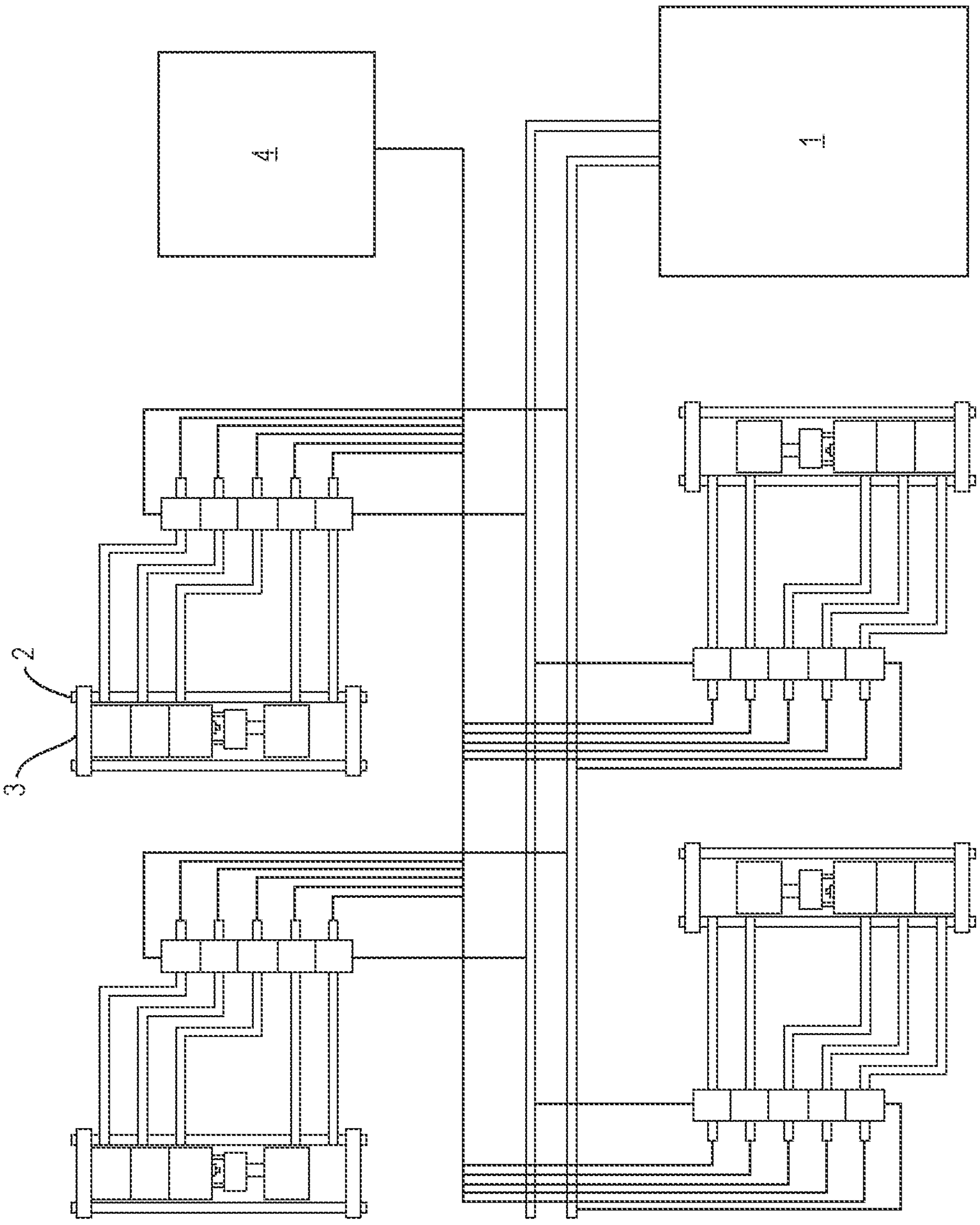
FIG. 3 is a schematic view of a modular manufacturing system controlled by the present invention.

FIG. 3 schematically shows a modular manufacturing assembly. The assembly includes an independent power source 1 and at least one manufacturing module 2 remotely associated therewith. Each manufacturing module 2 includes at least one tool 3 for forming a workpiece. Preferably, the tool 3 is operatively associated with a first end of a piston having a second force-receiving end. There is at least one force-applying assembly configured to apply force directly to the force-receiving end of the piston. The manufacturing module 2 is operatively and reciprocally connected to, and receives power from, the independent power source 1. Any number of different manufacturing technologies can be used in conjunction with the modular manufacturing assembly. For example, in one embodiment, the tool is a stamping press configured to stamp out parts, while in another the tool is configured as a forging or other art recognized press.

Figure 4:
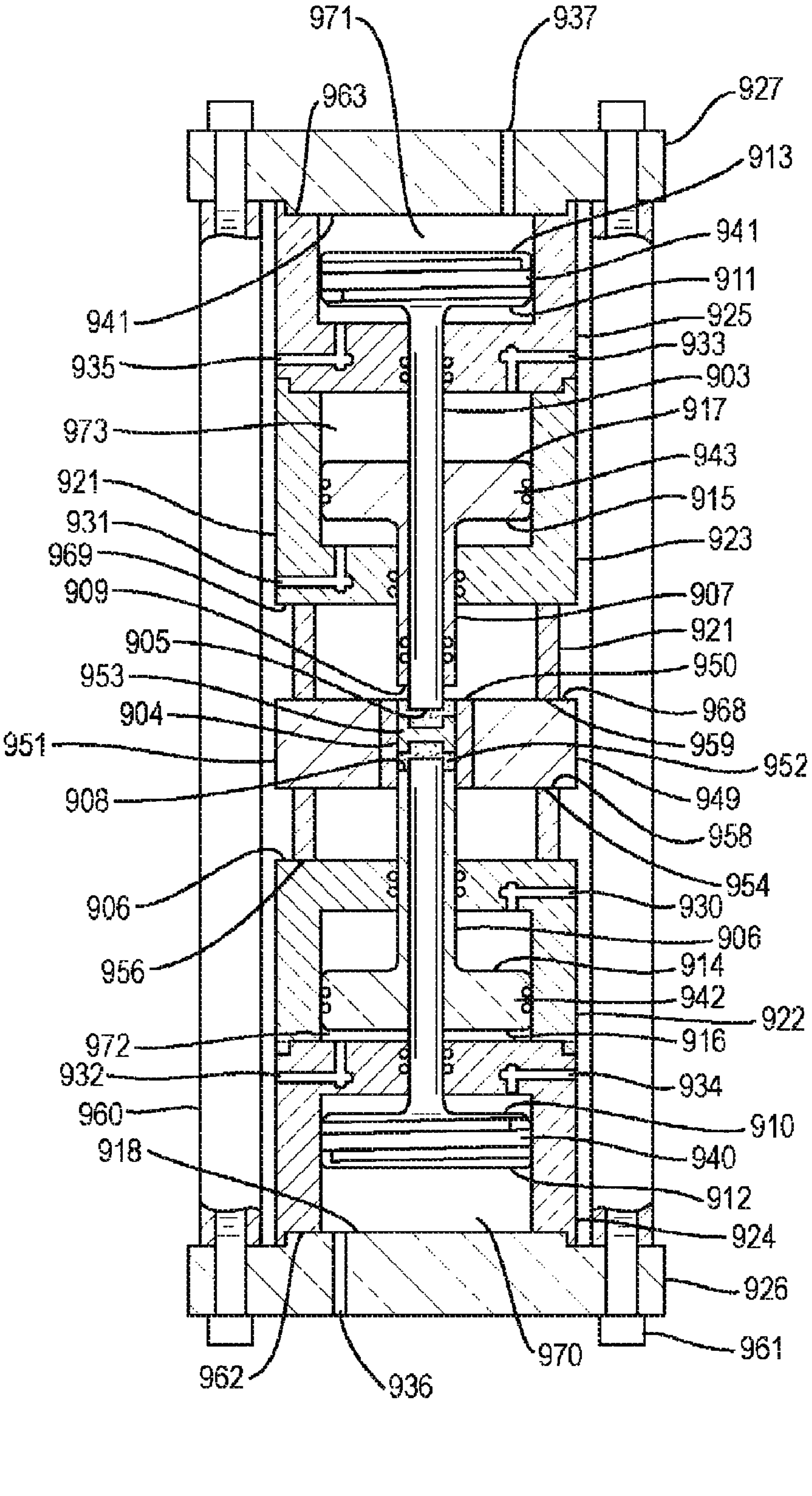
FIG. 4 is a sectional view of one embodiment of a press controlled by the present invention, in which force receiving pistons and respective cylinders are mounted concentrically with respect to each other.

FIG. 4 shows an embodiment of the press where the die 950 and the die cavity 951 are stationary relative to the structure of the press 901. The structure of the press 901 is made up of the die holder 949, and upper spacer ring 921, a lower spacer ring 920, at least a first upper cylinder 925, at least a first lower cylinder 924, an upper cylinder head 927, a lower cylinder head 926, at least three tie rods 960, and associated fasteners 961. The structure of press 901 is also comprised of second upper cylinder 923 and second lower cylinder 922. Pressure end surface 962 of first lower cylinder 924 is mounted against lower cylinder head interior face 918 to seal chamber 970 therein. Pressure end surface 966 of second lower cylinder 922 is mounted against retraction end surface 964 of first lower cylinder 924 so that second lower cylinder 922 is coaxially adjacent thereto and seals chamber 972 therein. Lower spacer ring 920 is coaxially adjacent to second lower cylinder 922, its cylinder side surface 956 being mounted against retraction end surface 968 of second lower cylinder 922. Die holder 949 is mounted coaxially adjacent to lower spacer ring 920, with lower die holder surface 954 mounted against die side surface 958.

Upper spacer ring 921 is coaxially adjacent to die holder 949, with spacer ring's die side surface 959 bearing against upper die holder surface 955. Second upper cylinder 923 is coaxially adjacent to upper spacer ring 921, with its retraction end surface 969 bearing against cylinder side surface 957 of upper spacer ring 923. First upper cylinder 925 is coaxially adjacent to second upper cylinder 923, with its retraction end surface 965 mounted against pressure end surface 967 of second upper cylinder 923, and seals chamber 973 therein. Upper cylinder head 927 is mounted coaxially to first upper cylinder 925, with its interior face 919 mounted against pressure end surface 963 and sealing chamber 971 therein.

Any number of cylinders may be mounted to provide the structure of a press, and other embodiments of the present invention may comprise more or fewer cylinders. Passing directly between upper cylinder head 927 and lower cylinder head 926 and connecting them so as to hold or tie the structure of press 901 together is at least one and preferably a plurality of tie rods 960, and associated fasteners 961. The tie rods 960 and fasteners 961 preferably have a cross sectional area for a given tie rod material and fastener material that is able to withstand a pressure approximately equal to the sum of the respective surface areas of the force-receiving ends of the pistons within the cylinders multiplied by the respective motive force being applied to each surface. These pressure values for a given tie rod material and fastener material and cross sections can be readily ascertainable. For safety reasons, it is of course preferable to exceed this calculated pressure by at least a factor of 2, and preferably 4. This can, for example, be accomplished through the addition of tie rods and fasteners, or by enlarging their cross sectional areas.

Because the cylinders are coaxially mounted within the structure of press 901, the punches are coaxial. Within first upper cylinder 925 is piston 941, with retraction face 911 connected to first upper punch 903, and with first upper punch face 905 affixed to its opposite end. Within first lower cylinder 924 is piston 940 connected at retraction face 910 to an end of first lower punch 902, and with first lower punch face 904 affixed to its opposite end. Within second upper cylinder 923 is piston 943 connected by its retraction face 915 to one end of second upper punch 907, with second upper punch face 909 affixed to its opposite end. Within second lower cylinder 922 is piston 942 connected by its retraction face 914 to one end of second lower punch 906, with second upper punch face 908 affixed to its opposite end.

Ports 936, 932, 933, and 937 are associated with cylinders 924,922, 923, and 925 respectively, to admit hydraulic fluid (not shown) under pressure from and outside source (not shown) into the cylinders, and to apply force to the force-receiving ends 912, 916, 917 and 913 of pistons 940, 942, 943, and 941 respectively, to cause the punches faces 904, 908, 909, and 905 to move in a direction toward die cavity 951. Ports 934, 930, 931 and 935 are associated with cylinders 924, 922, 923, and 925 respectively, to admit hydraulic fluid (not shown) under pressure from and outside source (not shown) into the cylinders, and to apply force to the retraction faces 910, 914, 915 and 911 of pistons 940, 942, 943, and 941 respectively, to cause the punches faces 904, 908, 909, and 905 to move in a direction away from die cavity 951. In operation, particulate material 952 is introduced into the die cavity 951 while first and second lower punch paces 904, 908 form a floor in the die cavity 951 to contain particulate material 952 within die cavity 951. Hydraulic pressure is applied to the force-receiving faces 912, 913, 916, and 917 of pistons 940, 941, 942 and 943, causing punch faces 904, 905, 908 and 909 to move toward the uncompacted powder that includes the particulate material 952 contained in die cavity 951. The punches enter the die cavity, compacting and consolidating the particulate material therein. Upon sufficient compaction of the particulate material, first upper punch 903 and second upper punch 907 are withdrawn via the application of hydraulic pressure on retraction faces 911 and 915 until sufficient clearance is achieved for consolidated article 953 to be withdrawn from die cavity 951. Hydraulic pressure is then applied again to force-receiving face 912 of first lower piston 940 and force-receiving face 916 of second lower piston 942, causing the consolidated article 953 to move toward the withdrawn upper punch faces 905 and 909. Hydraulic pressure is applied continuously until consolidated article 953 clears the die cavity 951 and can be removed from the press 901. Upon retrieval of the finished workpiece 953, hydraulic pressure is applied to the retraction faces 910 and 914 of the lower pistons, causing the punches and die to move to the compaction procedure starting position.

Because cylinders that are adjacent to each other can be in contact with and attached to each other, and shafts may be nested within each other. Other embodiments of the invention may have more or fewer cylinders, pistons and punches than are shown by the embodiments of the present invention do not require all of the described punch and die sets.

In an alternative embodiment, both the upper and lower punches are introduced into the die cavity to a distance that is sufficient to allow the filling of each level of the die to be proportional to the finished levels of the compacted workpiece in the die cavity.

Figure 5:
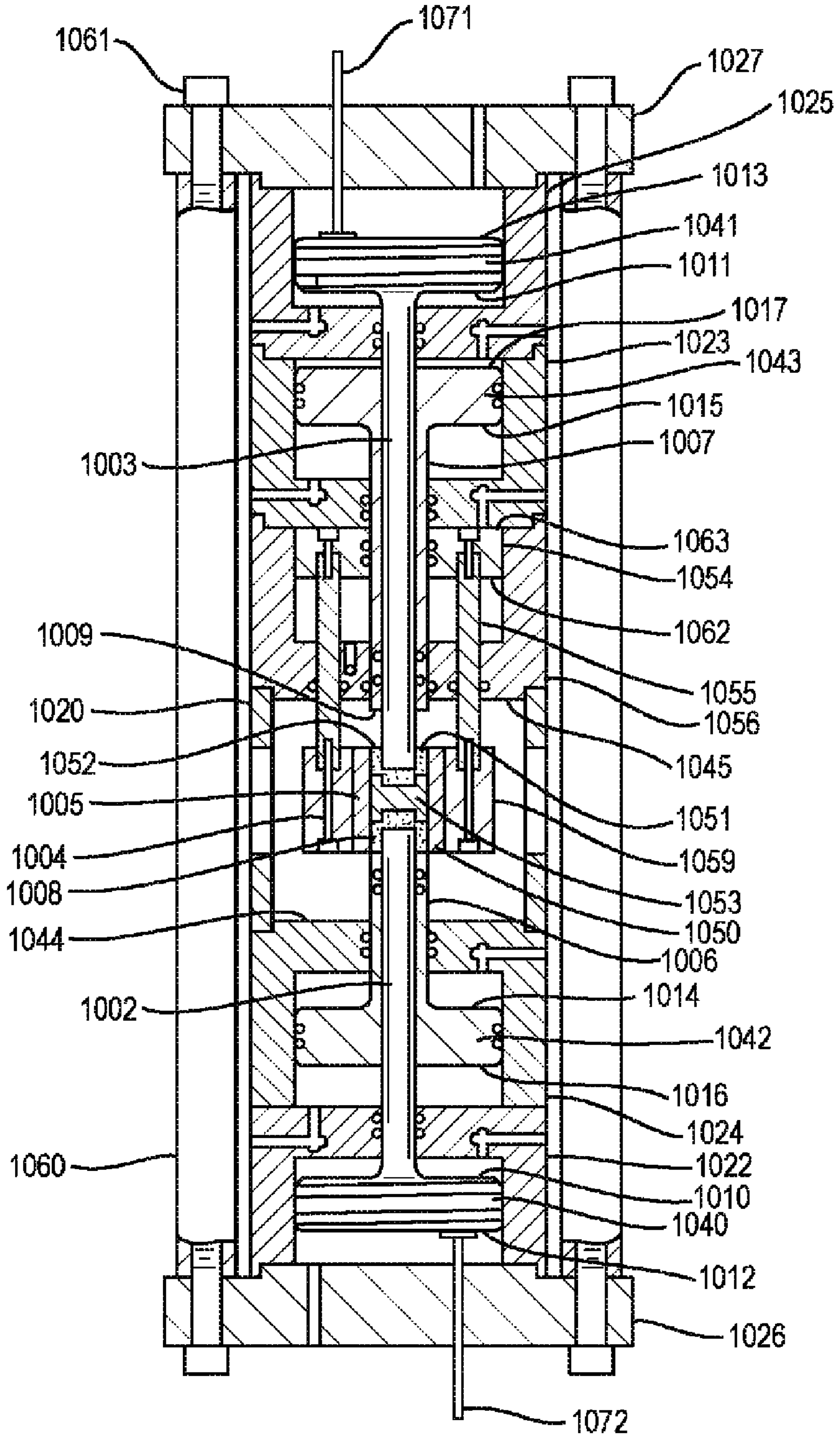
FIG. 5 is a sectional view of another embodiment of a press controlled by the present invention.

FIG. 5 shows an embodiment of the present invention where the die 1050 and the die cavity 1051 move axially relative to the structure of the powder metallurgy press 1001. The structure of the press 1001 includes the die 1050, at least a first upper cylinder 1025, at least a first lower least a first upper cylinder 1025, at least a first lower cylinder 1022, and upper cylinder head 1027, a lower cylinder head 1026, at least three tie rods 1060, and associated fasteners 1061. The structure of press 1001 also includes a second upper cylinder 1023, second lower cylinder and spacer ring, which are mounted coaxially in a manner similar to the shown in FIG. 4. Spacer ring 1020 is coaxially adjacent to second lower cylinder 1024, and the opposite end mounted against retraction end surface 1045 of die cylinder 1056. Die 1050 is affixed or formed in die holder 1059, which is affixed to an end of at least on die rod 1055, with the opposite end of die rod 1055 affixed to die piston 1054 which is able to move slidably within die cylinder 1056.

Because the cylinders are coaxially mounted within the structure of press 1001, the punches are coaxial. Within first upper cylinder 1025 is piston 1041, with retraction face 1011 connected to first upper punch 1003, and with first upper punch face 1005 affixed to its opposite end. Within first lower cylinder 1022 is piston 1040 connected at retraction face 1010 to an end of first lower punch 1002, and with first lower punch face 1004 affixed to its opposite end. Within second upper cylinder 1023 is piston 1043 connected by its retraction face 1015 to one end of second upper punch 1007, with second upper punch face 1009 affixed to its opposite end. Within second lower cylinder 1024 is piston 1042 connected by its retraction face 1014 to one end of second lower punch 1006, with second upper punch face 1008 affixed to its opposite end.

Affixed respectively to first upper piston 1041 and first lower piston 1040 are punch position indicators 1071 and 1072. Although shown mounted to pistons, one skilled in the art would realize that punch position indicators 1071, 1072 may also be attached to any portion of the press that moves. The distance each punch had moved is indicated by its respective tool position indicators, and is detected by sensors (not shown) associated with the tool position indicators 1071, 1072, the signals from which are sent to the control system for use, for example, by the microprocessor controlled electronic controller 372 shown in FIG. 1. In the preferred embodiment, all position indicators 1071, 1072 measure position from a single reference point, eliminating position errors caused by flexing of the press during operation. Regardless of how many reference points are used, however, the computer program product of the present invention uses the information from tool position indicators 1071 and 1072 and their associated sensors (not shown), to directs the control system to control the distance that the punches move. Thus, the control system may also determine whether the particulate material has been sufficiently compacted to form a consolidated article 1053. Furthermore, as shown in FIG. 3, a single controller 4, or control system, can control the operation of a plurality of presses, and can accept data input from various sensing devices affixed to a plurality of presses.

In some embodiments, enhanced accuracy may be obtained by increasing the gain on the position sensors when the punch nears the end of its cycle. This is a byproduct of the need to balance the hydraulic and electrical gains on the system. When very little pressure is being applied to the part, i.e. when the powder is not yet compacted the point where it offers much resistance, the hydraulic gain on the system is low. Conversely, when the hydraulic gain is increased, the electrical gain on the sensors is also increased to maintain balance. When this is increased, the sensors will sample at a much faster rate allowing for far more accurate parts at the end of the pressing cycle. Thus, by slowing down the speed of the punch during the last few 0.0.0000ths of an inch of travel, the accuracy of the punch position measurement may approach the 2 to 5 microns tolerance of the preferred sensors.

This is a distinct advantage of the present system and is one aspect of what the inventor considers to be the present invention.

In operation, particulate material 1052 is introduced into the die cavity 1051 while first and second lower punch faces 1004, 1008 form a floor in the die cavity 1051 to contain particulate material 1052 within die cavity 1051. Hydraulic pressure is applied to the force-receiving faces 1012, 1013, 1016, and 1017 of pistons 1040, 1041, 1042, and 1043, causing punch faces 1004, 1005, 1008, and 1009 to move toward the particulate material that comprises the uncompacted powder 1052 contained in die cavity 1051. The punches enter the die cavity, compacting and consolidating the particulate material therein. Upon sufficient compaction of the particulate material, first upper punch 1003 and second upper punch 1007 are withdrawn by application of hydraulic pressure on retraction faces 1011 and 1015. Hydraulic pressure is then applied to die piston force-receiving face 1063, causing die 1050 and die holder 1059 to move toward second lower cylinder 1024. Because first and second lower punches 1002 and 1006 are maintained in position, the movement of die 1050 causes workpiece 1053 to emerge from the side of the die opposite to that where the lower punches enter. Upon retrieval of the finished workpiece 1053, hydraulic pressure is applied to the retraction faces 1010 and 1014 of the lower pistons and the retraction face 1062 of the die piston 1054, causing the punches and die to move to the compaction procedure starting position.

Figure 6:
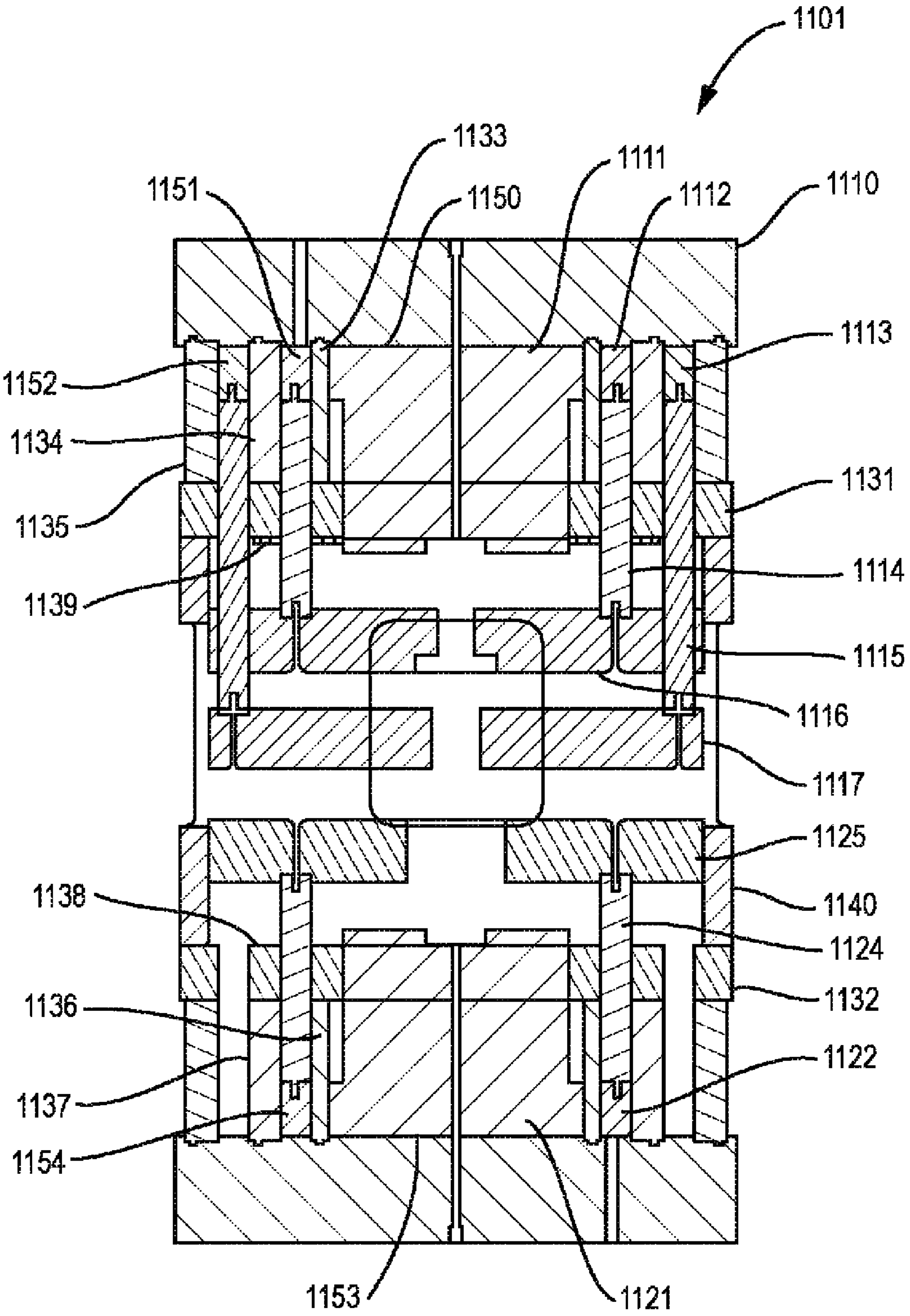
FIG. 6. is a sectional view of still another embodiment of a press controlled by the present invention.

Embodiments of the present invention may incorporate alternate arrangements of cylinders and pistons, such as the arrangement shown in FIG. 6, wherein the pistons and cylinders are arranged concentrically. Concentric piston press 1101 is shown having a first upper cylinder 1133, second upper cylinder 1134, and a third upper cylinder 1135, all having the same length relative to their common axis, arranged concentrically, commonly attached to the upper cylinder head 1110 at one end of the cylinders, and commonly attached to the upper cylinder and 1131 at the opposite end of the cylinders. Likewise, a first lower cylinder 1136 and a second lower cylinder 1137, which have the same length relative to their common axis, are arranged concentrically, with one end of the cylinders attached to the lower cylinder head 1120, and the opposite end of the cylinders attached to the lower cylinder end 1132. The external surface 1138 of lower cylinder end 1132 is abutted coaxially to one end of cylinder spacer 140, and the opposite end of cylinder spacer 1140 is abutted coaxially to the external surface 1139 of upper cylinder end 1131. Thus the upper assembly of cylinders and pistons is oriented coaxially opposite the lower assembly of cylinders and pistons.

Figure 7:
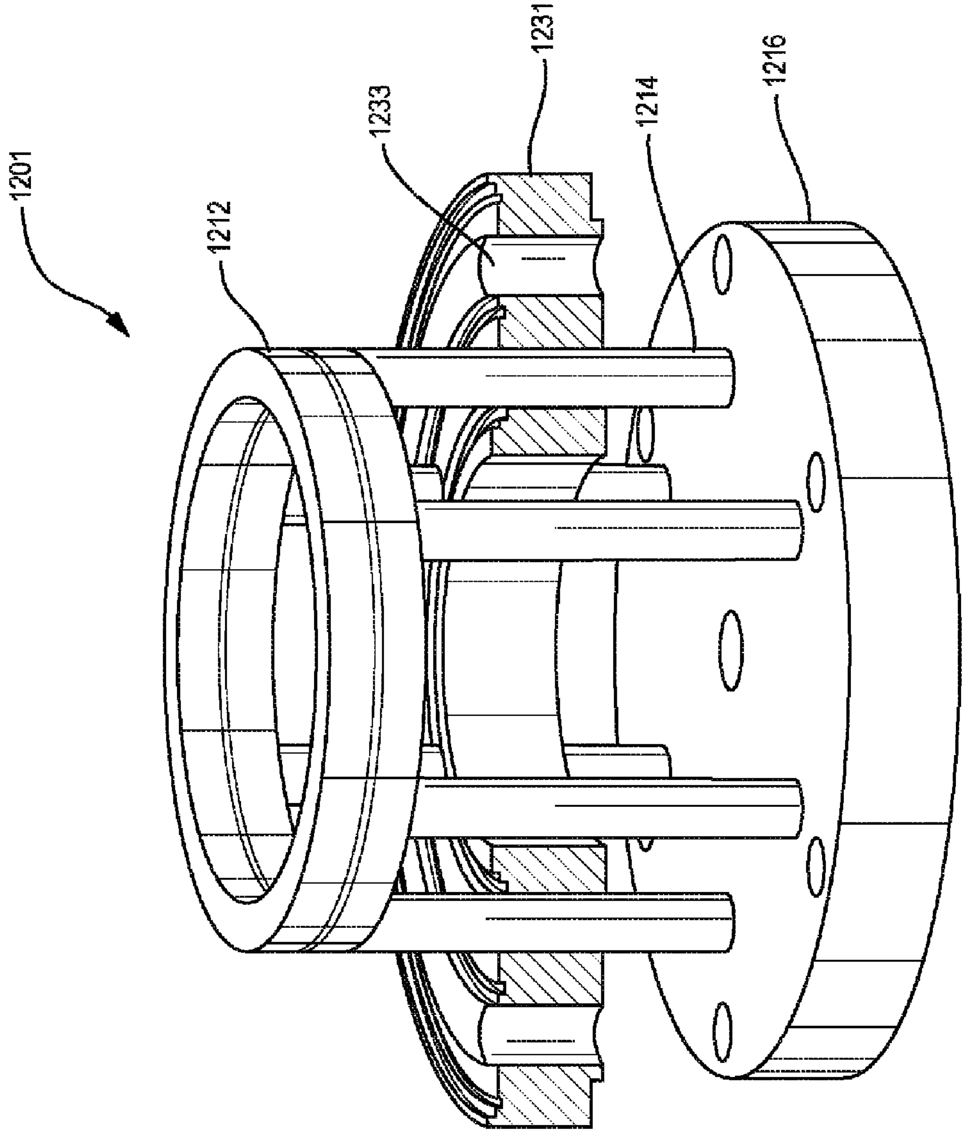
FIG. 7 is a partial sectional view of an annular piston assembly utilized in some embodiments of presses controlled by the present invention.

FIG. 7 shows the arrangement of certain features of a concentric piston press. Annular piston assembly 1201 is made up of an annular piston 1212 affixed to at least one, and preferably a plurality of, punch rods 1214, further affixed to punch holder 1216. Punch rods pass through cylinder end 1231, and are able to move slidably through openings 1233 in cylinder end 1231.

Figure 8:
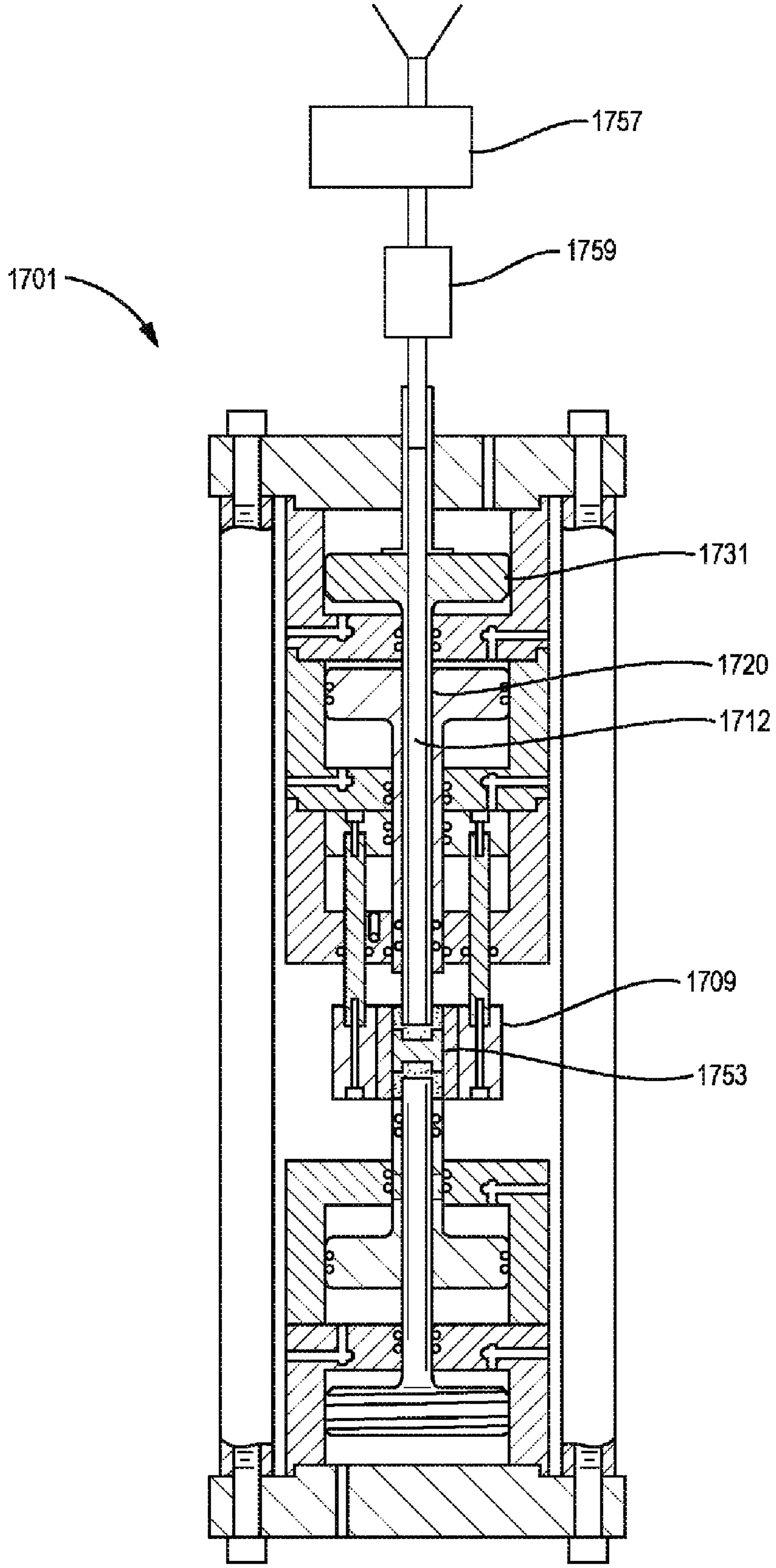
FIG. 8 is a sectional view of another embodiment of a press controlled by the present invention, showing the integration of the press with a hopper, weighing means and valving means.

FIG. 8 shows a powder metallurgy press 1701 in which particulate material to be formed into a finished article 1753 is delivered to the empty die 1709 via a channel 1712 through a first upper piston 1731 and first upper piston shaft 1720. The quantity of particulate material to be used measured by a weighing means 1757, and controlled by a valving means 1759 or other means of controlling the flow of particulate material. The quantity and flow of the particulate material are controlled by the control system of the present invention as described in detail below.

The press system may be operated using a method for preventing part cracking upon ejection from the press. The preferred press has at least one press piston operatively associated with a press punch. The press is so configured as to allow independent control and movement of each of the press pistons relative to each other press piston. Particulate material is provided to the die cavity of said press and the workpiece is made on the press by moving each of the press pistons toward the die until each press piston exerts pressure on the particulate material, thereby consolidating the particulate material into the workpiece.

In the part making phase of this method, the press piston(s) may be moved toward the die until the piston reaches a fixed position, which is predetermined based on calculations in connection with the desired part density, surface area, etc. One of skill in the art would immediately recognize the calculations necessary to determine the fixed position for the pistons. Alternatively, the press piston(s) are moved toward the die until it/they reach a fixed pressure per square inch being exerted against the surface of the particles. Once again, those of skill in the art would recognize the calculations necessary to determine the pressure needed to make an individual part. Finally, the method can optionally include the step of moving each piston to a position where the workpiece is ejected from the die while maintaining substantially uniform support on the workpiece or, alternatively, moving the die relative to the workpiece while once again maintaining substantially uniform support on the workpiece.

In general terms the goal of this method is to provide uniform support on a pressed part during the ejection phase of a part making cycle. In traditional pressing methods, once the pressing phase is over, the various punches will deflect or shorten disproportionately leaving the part being unevenly supported once the ejection phase begins. The result being that the part cracks upon ejection. By using the present pressing system, the pressing mode can be switched to pressure and the pressure is uniformly distributed on all pistons to make up for any shortening that may have occurred.

The present invention is a method, control system, computer program, and article of manufacture for controlling press systems, such as those described above. The control system is designed to control a press having a die, at least two separate sets of workpiece forming punches, and at least two hydraulic pistons, each operatively associated with one set of workpiece-forming punches, although it is recognized that other presses having only a single workpiece forming punch may also be utilized. In its most basic form, the control system includes a means for controlling a magnitude of a pressing force applied by each set of workpiece-forming punches, and a means for controlling a position of each set of workpiece-forming punches relative to the die.

Figure 9:
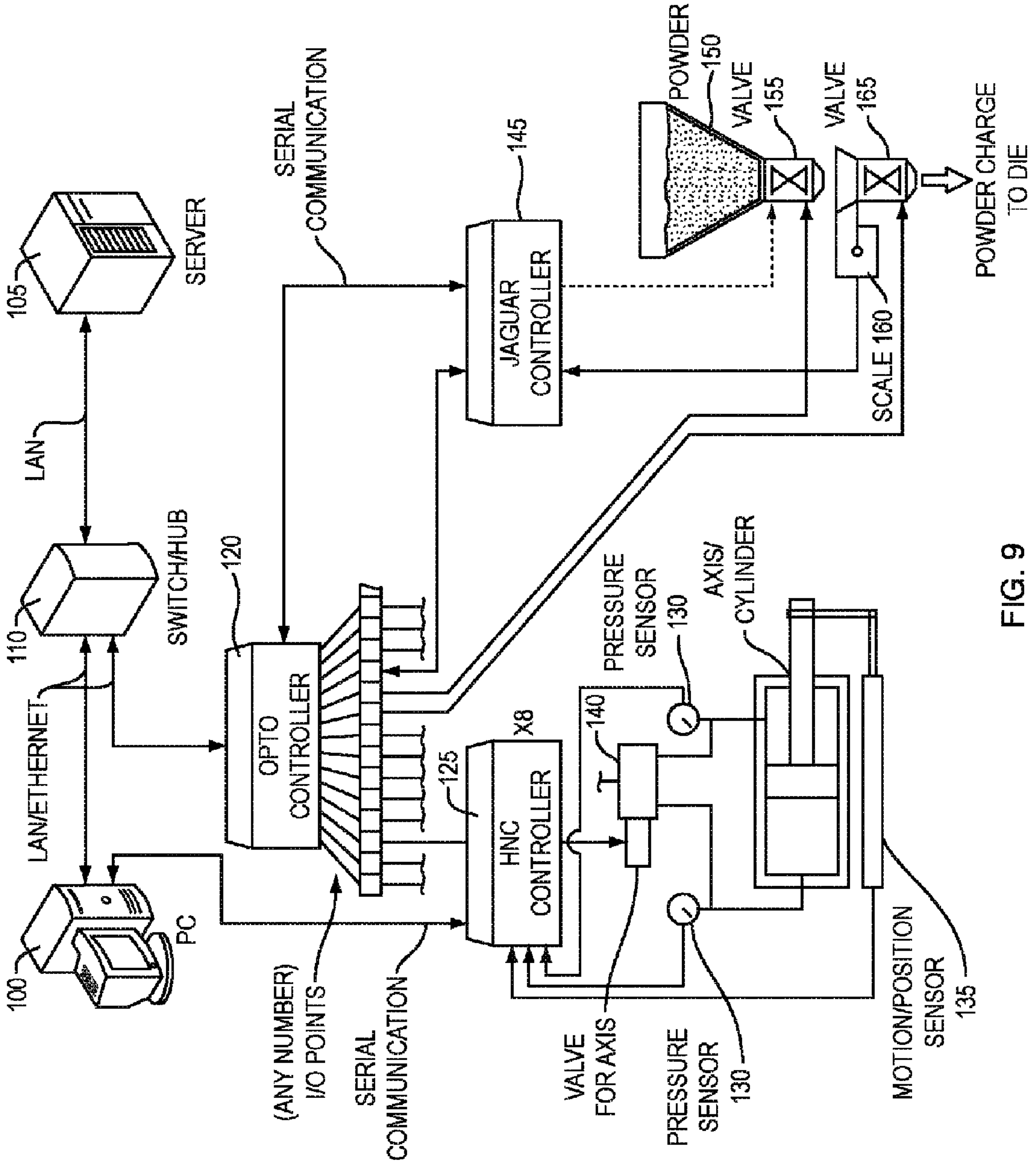
FIG. 9 is a schematic view of the control system of the present invention.

As shown in FIG. 9, the preferred control system utilizes a "distributed intelligence" computer system, with several controllers arranged in a hierarchy controlling the pressing process. There are preferably eight "axes", with each "axis" corresponding to a single piston/cylinder/punch in a press module. It is envisioned that, in some embodiments, a single computer would run the system, rather than distributing the decisions and actions to different logic processors. However, because the preferred controllers utilize time-slice architecture, the hydraulics closed loop control processing time may be slowed enough to suspend tasks periodically. Accordingly, it is understood that different controllers would need to be utilized in the implementation of such an embodiment.

In the preferred control system, a personal computer 100 serves as an interface through which the programmer builds the computer program and inputs the desired data structures for controlling the press. Once built, the programmer loads the program and data structures into the main controller 120, which is associated with all the input/output points in the system. The main controller 120 is preferably a Model No. SNAP-LCM4 controller manufactured by OPTO 22 of Temecula, Calif. However, it should be understood that this type of controller, personal computers, and other art recognized devices that include a microprocessor, inputs and outputs that are used to control mechanical operations, are generally referred to herein as a "controllers".

The main controller 120 directs a set of hydraulic axis controllers called HNC 125, which serve both as the means for controlling a magnitude of a pressing force applied by each set of workpiece-forming punches, and the means for controlling a position of each set of workpiece-forming punches relative to the die. The HNC 125 are preferably Model HNC100 Series 2X controllers, manufactured by Rexroth of Bethlehem, Pa. However, other controllers may be substituted to achieve similar results. The preferred HNC 125 have intelligence and are independently programmed, preferably via the personal computer using a Winped tool, which sends industry standard numerical control programming language. It is also preferred that each HNC 125 be independent of the others, with up to eight HNC 125 per press station, corresponding to one per axis.

At the direction of the control program, the main controller 120 sends out signals telling the HNC 125 when to take an action. For each HNC 125, the main controller 120 preferably has four outputs, which operate on a binary basis. The four outputs with binary states result in sixteen "modes", or actions, that the main controller 120 may signal to each HNC 125. These modes correspond to a pressure, a velocity, a position, or a combination thereof, for each set of workpiece forming punches. Each HNC 125 directly controls the valve that operates each "axis", and also takes in the signals from the associated sensors for that axis, such as the pressure sensors 130 and position sensors 135 described above and shown in FIG. 9. In the preferred embodiment, the sensors 130, 135 communicate solely with the HNC 125, which insure that the desired pressure and/or position are achieved. In others, the results are continuously fed back through the main controller 120 to the personal computer 100, where they are analyzed and transferred through a LAN 100 to a server 105, where they are stored into memory. The HNC 125 also send signals to the main controller 120 when the programmed inputs have been achieved, allowing the control program to go to the next action and signal it to occur.

The preferred control system is adapted to control a hydraulic powder press, and also includes a means for controlling an introduction of a powder material into the die. In some embodiments of this system, the means for controlling an introduction of a powder material into the die includes a means for controlling a weight of the powder material introduced into the die, while in others it is a means for controlling a temperature of the powder introduced into the die.

Referring again to FIG. 9, the preferred means for controlling a weight of the powder material introduced into the die includes the main controller 120, a scale controller 145, a hopper valve 155, and a scale 160. The main controller 120 also communicates with the scale controller 145 that is associated with the weighing station or stations. The scale controller 145 is preferably a "Jaguar" Model JTPA-1171 controller manufactured by Mettler Toledo of Columbus, Ohio, which is programmable via a personal computer using a serial communications program. In addition to the main controller 120, the scale controller 145 is in direct communication with the scale 160 and hopper valve 155, and controls the opening of the hopper valve 155 to allow a desired flow of material to the scale 160.

The preferred scale 160 is a load cell type scale 160 and the preferred hopper valve 155 is a Red Valve numerically controlled bladder or pinch valve. However, it is understood that other types of art recognized scales 160 and hopper valves 155 may be readily substituted to achieve similar results.

In a preferred system and method of operation, the main controller 120 will communicate the "new" set points to the scale controller 145 upon initialization of a new part for manufacture. These set points will typically include a target weight, a tolerance weight, weight set points for fast feed, slow feed and dribble feed operation, and an in-flight factor to take into account the distance between the hopper and the scale 160.

Once the scale controller 145 has been initialized, the main controller 120 sends a signal to the scale controller 145 to begin a weigh cycle and the scale controller 145 opens the hopper valve 155 for fast feed. Based upon feedback from the scale 160, the scale controller 145 determines when the weight set point for slow feed has been reached and closes the hopper valve 155 to its slow feed position. Similarly, the scale controller 145 subsequently determines when the when the weight set point for dribble feed has been reached and closes the hopper valve 155 to its dribble feed position. Finally, taking into account the in-flight factor, the scale controller 145 determines when a lower tolerance weight has been reached, and closes the hopper valve 155 fully.

Once the flow of powder is stopped, the scale controller 145 sends a signal to the main controller 120 indicating either the actual weight, or that an error has occurred with the scale 160. The main controller 120 then compares the actual weight to the tolerance weight and will signal an alarm if the actual is out of tolerance. The inclusion of such an alarm is preferred as the die or press itself may be damaged if too much power is fed therein. In the preferred control system, the main controller 120 will then continue to initiate weigh cycles as soon as one successfully weighed charge of powder is transported from the scale 160. In this manner, there is always a charge of powder ready to be pressed once the pressing cycle has been completed. However, in other embodiments, the weigh cycle is only initiated after a full press cycle is completed.

In some embodiments, the actual weight communicated by the scale controller 145 is communicated from the main controller 120 back to the computer, where it is stored into memory. The stored data may then be later analyzed as a variable in quality control or other analyses.

In some embodiments of the control system, the means for controlling an introduction of a powder material into the die comprises a means for controlling a temperature of the powder material 200. The preferred heating method is to heat the powder in the die via fluidization, as described with reference to FIG. 4. However, the powder can be heated in a number of ways, including preheating in a feedshoe, via a coil over heating duct, microwave energy or the like.

Figure 10:
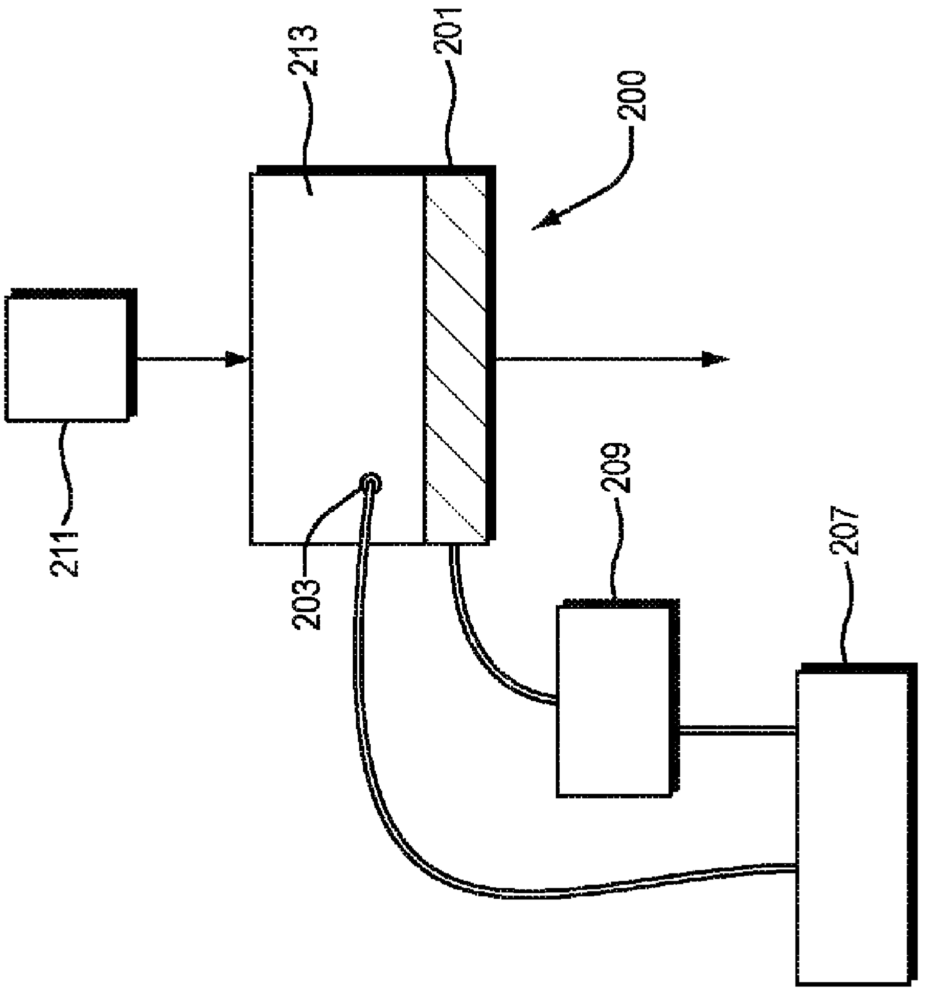
FIG. 10 is a schematic view of the preferred means for controlling the temperature of the powder material.

FIG. 10 shows one means for controlling the temperature of the powder material 200 includes at least one heater 201 for heating the powder material, at least one temperature sensor 203 for sensing a temperature of the powder material, and at least one temperature controller 205 for controlling a temperature of the powder material based upon an input from the temperature sensor 203.

The heater 201 is preferably a resistance-type heating element, although it is understood that other types of art recognized heaters, such as induction heaters, hydronic heaters, forced convection heaters, piezoelectric heaters, or a combination of types of heaters and/or heating elements could be substituted for the preferred resistance-type heating element to achieve similar results. In some embodiments, the heater 201 is formed as part of a conventional powder furnace 213, which preheats the powder before it is provided to the die. In other embodiments, the heater 201 is integrated into the die itself and acts to heats the powder after it is introduced into the die. In the preferred embodiment, however, heating elements 201 are integrated into a powder furnace, the die and the punches in order to equalize the overall temperature of the die, punches and powder during the forming process.

The preferred temperature sensor 203 is an industry standard thermocouple of a type suited to accurately measure temperature within the desired range. However, other art recognized temperature sensors such as, for example, infrared sensors, could be substituted to achieve similar results.

The preferred temperature controller 207 is the same OPTO 22 controller that is also used in the preferred system to control the movement of the punches via the HNC (see FIG. 9). However, it is recognized that a separate temperature controller could be provided, or that the personal computer 100 of the preferred control system could be utilized, to achieve similar results. The preferred temperature controller 207 is in communication with both the temperature sensor 203 and a power supply 209, which supplies power to the heating element 201, and acts to control the temperature of the powder by controlling the power sent to the heating element 201.

In the preferred method of operation, the temperature controller 207 receives an initialization command from the personal computer 100 that includes data relating to the desired temperature, tolerance temperature and the desired heating times necessary to heat the powder, die and/or punches to the desired temperature. The temperature controller 207 then sends a signal to the power supply 209 to start the flow of power to the heater 201. The power supply 209 continues the flow of power until the desired heating time, or desired temperature, has been reached, at which time the temperature controller 207 sends a signal to the power supply 209 to stop the flow of power to the heater 201.

In other embodiments of the method, the power supply 209 is a variable-power power supply 209 and the temperature controller 207 operates in a manner similar to the scale controller 145 discussed above. In this method, the personal computer 100 sends initialization data to the temperature controller 207 relating to desired temperature, tolerance temperature, low power temperature set point, and trickle power temperature set point. The temperature controller 207 then sends a signal to the power supply 209 to energize at maximum power and monitors the feedback from the temperature sensor 203. Once the temperature reaches the low power temperature set point, the temperature controller 207 sends another signal to the power supply 209 to reduce power to low power. The temperature controller 207 then continues to monitor the temperature until it reaches the trickle power temperature set point, at which time the temperature controller 207 sends another signal to the power supply 209 to reduce power to trickle power. Finally, once the temperature has reached a point within the tolerance temperature of the desired temperature, the temperature controller 207 sends a signal to the power supply to stop the flow of power to the heater 201.

Figure 11:
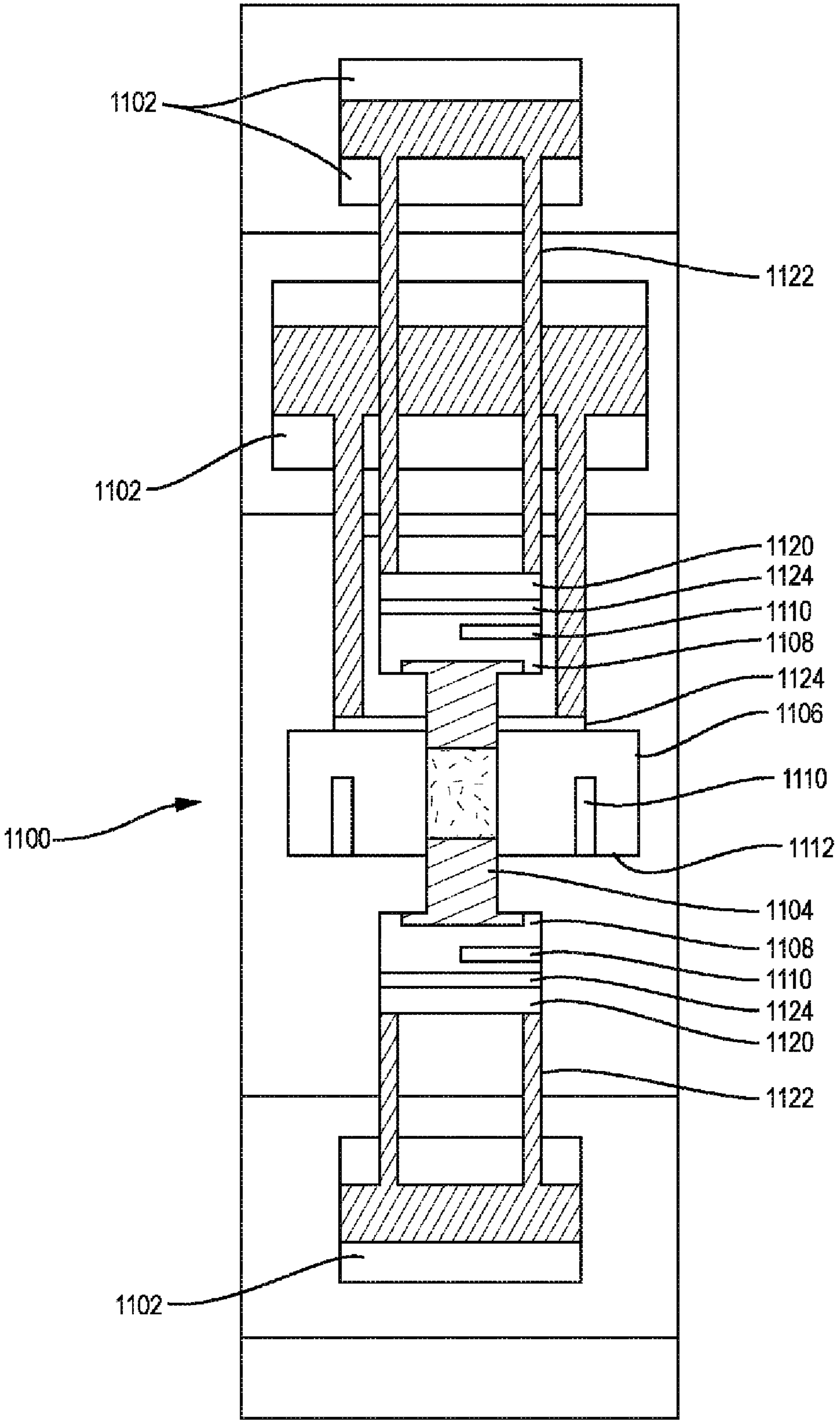
FIG. 11 is a cut away view of another embodiment of the press system utilizing heating of the die and punches an thermal isolation of the hydraulic cylinders.

FIG. 11 shows another embodiment of system in which powder is preheated. In this embodiment, the powder is heated by heating the punches 1104 and die 1106 via a plurality of heaters 1110 disposed within the die 1106 and punch holders 1108. The temperature of the punch holders 1108 and die 1106 are monitored by thermocouples 1112, which provide feedback to the control system (not shown). By heating the punches 1104 and die 1106, the environment in which the powder (not shown) is disposed during pressing is at an elevated temperature, causing the temperature of the powder to increase to a desired level.

Unfortunately, heating the powder in this manner has drawbacks that need to be addressed in order for this system to function properly. In order to maintain the accuracy of the press, it is important to maintain a constant temperature; i.e thermal equilibrium, within the hydraulic fluid. This may be accomplished by circulating the hydraulic fluid through piston cylinders 1102 and an external heat exchanger and chilling system (not shown) in order to remove or add heat to the hydraulic fluid. However, this circulation and subsequent cooling is not sufficient to prevent boiling of the hydraulic fluid at its point of contact with the hot piston holders 1110. In order to address this situation, the press system 1100 of FIG. 11 includes insulation plates 1124 and cooling manifolds 1120, which thermally isolate the piston rods 1122 from the heated punch holders 1108 and die 1106. In a preferred embodiment, the cooling manifolds 1120 are liquid cold plates through which cold water is circulated. However, other art recognized cooling methods may likewise be used to achieve similar results.

It is recognized that thermal isolation of the hydraulic fluid from the heated portions of the press has applicability beyond those in which heated punches 1104 and dies 1106 are used, and may likewise extend to those embodiments in which the powder is heated using other means. Further, by providing this isolation, the press may be used as a forging press in which the die may be used to produce near net shape forged parts from a powder in a single operation. In such an embodiment the powder is preferably preheated and the tools are preheated to produce forging temperatures of between one half and two thirds of melting point of powder to be forged; e.g. 1200 to 1500 Deg. Fahrenheit for steel. By so pressing the heated powder, all additional steps traditionally required for forging are eliminated, offering significant cost advantages over traditional processes.

In other embodiments, the means for controlling an introduction of a powder material into the die includes a means for controlling a creation of a substantially uniform distribution of powder material in the die. The means for controlling a creation of a substantially uniform distribution of powder material in the die preferably includes a means for controlling a fluidization of the powder material within the die.

Figure 12:
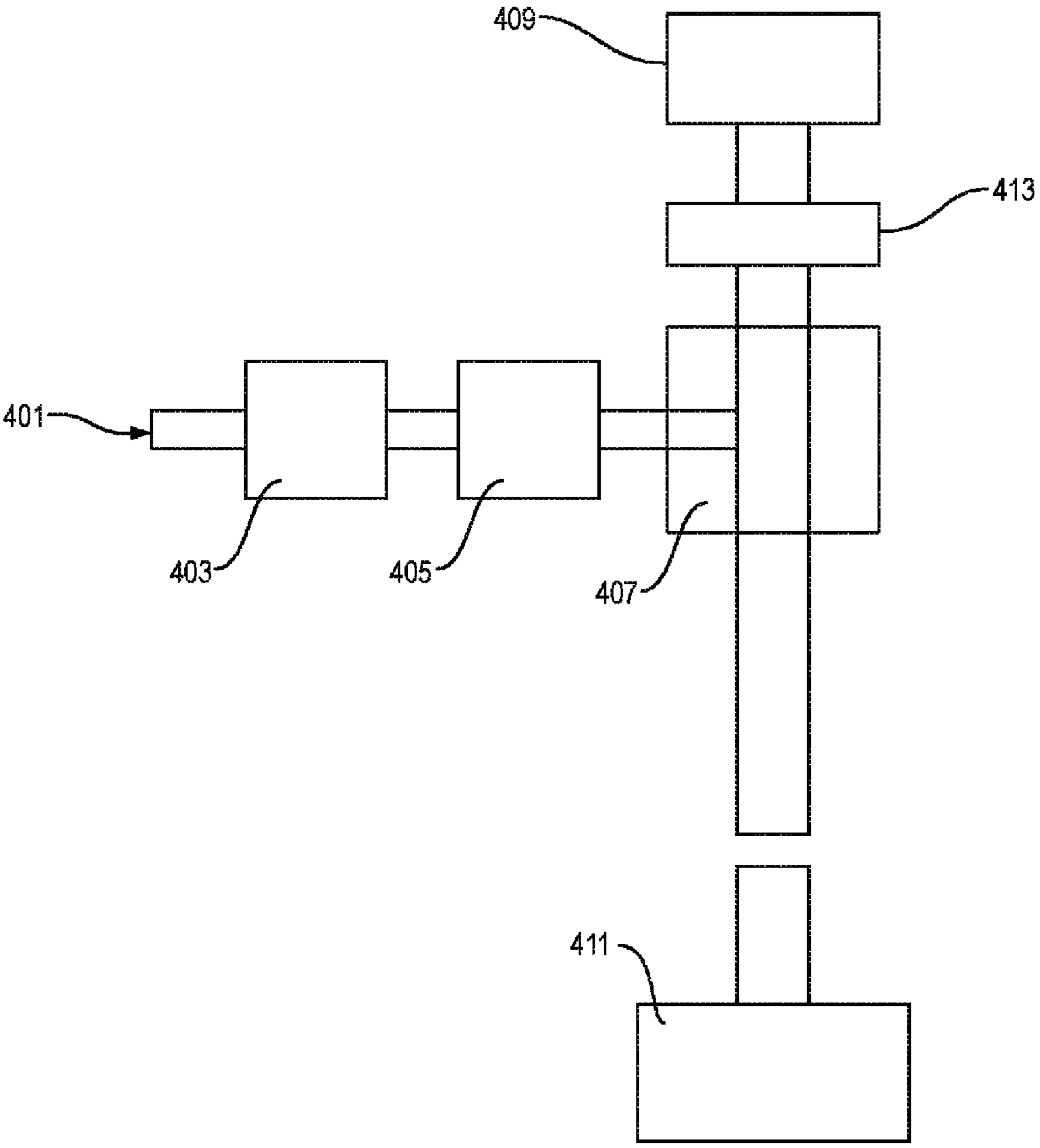
FIG. 12 is a schematic view of the preferred means for controlling the fluidization of the powder material.

As shown in FIG. 12, the preferred means for controlling a fluidization of the powder material within the die 400 includes a pressurized air input 401, an electronic pressure regulator 403, a poppet valve 405, and a branch connection 407 that connects the air input 401 and the powder source 409 with the die cavity 411. In operation, the poppet valve 405 is closed to shut off the flow of air into the branch connector 407 and powder is allowed to flow through the branch connector 407 and into the die cavity 411. Once the powder is introduced, the powder source 409 is sealed from the system, preferably via a pinch valve 413, and the poppet valve 405 is opened allowing pressurized air is to enter the branch connector 407 and flow into the die cavity 411, where the powder is disposed. This pressurized air is then cycled, or pulsed, by the pressure regulator 403 and poppet valve 405, which causes the powder to be fluidized within the die.

It is noted that the preferred branch connector 407 is block having an internal tee, which provides a straight run for the powder and reduces wear. However, it is recognized that other branch connectors, such as those forming a Y, could be substituted to achieve similar results. Further, the preferred means for controlling a fluidization of the powder material within the die 400 is controlled by the same controller as is used to control the workpiece forming punches. However, it is recognized the other means, such as separate controllers, or the computer, may also be utilized to achieve similar results.

In some embodiments, a heater is added to the fluidization system of FIG. 12 and is used to heat the pressurized gas used for fluidization in order to heat the powder in the die. In these embodiments, at least one temperature sensor is placed in communication with the computer for sensing a temperature of the pressurized gas, and at least one temperature controller is in communication with the computer and the heating element. In operation, the computer accepts an input from the temperature sensor corresponding to a temperature of the pressurized gas, directs the computer to compare the temperature of the pressurized gas with a desired temperature and determine how to adjust the temperature of the pressurized gas based upon a result of the comparison between the temperature of the pressurized gas and the desired temperature. The computer then sends an output to the heater to control the temperature of the pressurized gas. This method of heating the powder has distinct advantages, foremost of which are the ability to obtain substantially uniform heating of the powder, the ability to heat the powder rapidly to temperature, and the ability to eliminate powder furnaces and the like from the system.

Figure 13A:
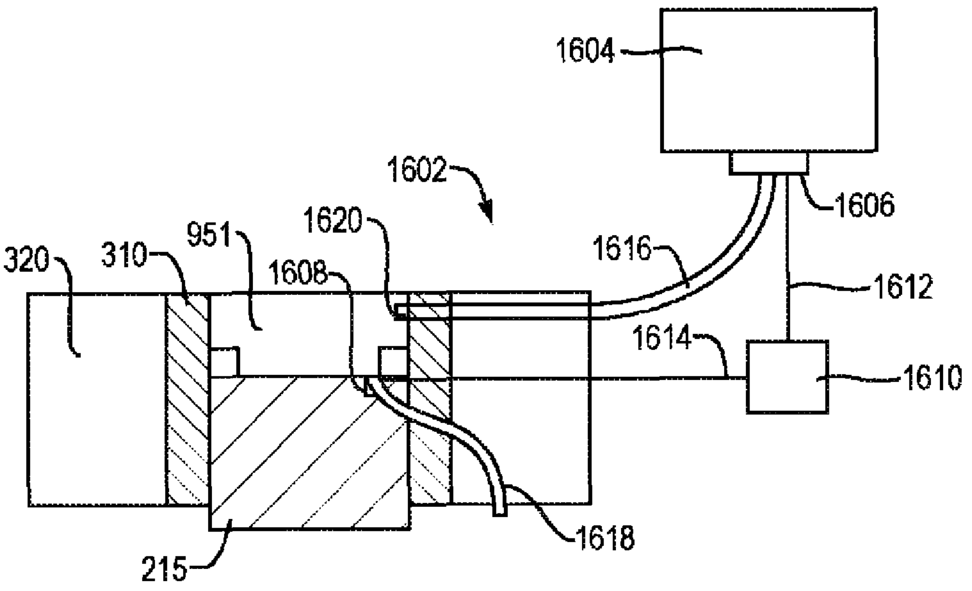
FIG. 13A is a schematic view of the preferred means for controlling the lubrication of the die cavity.

The preferred control system additionally includes a means for controlling die cavity lubrication 1602. As shown in FIG. 13A, the preferred means for controlling die cavity lubrication includes a lubricant source 1604, a lubricant fill valve 1606 attached to the lubricant source 1604 such that a flow of lubricant (not shown) from the source may be controlled, a lubricant drain valve 1608 attached to the die such that a flow of lubricant from the die may be controlled, and a means for controlling lubricant volume 1610 within the die by allowing draining and filling of lubricant to occur in the die.

In operation, the preferred means for controlling die cavity lubrication 1602 utilizes a fill-and-drain technique. The means for controlling die cavity lubrication is amenable to any of the press variations described herein. Using the means for controlling die cavity lubrication might, however, be redundant with embodiments of the present invention having punches coated with non-stick material. Though one is certainly free, it is not recommended for at least the reason of cost efficiency not to duplicate lubrication within the press.

The lubricant source 1604 contains an arbitrary amount of lubricant (not shown). A signal from the means for controlling lubricant volume 1610 travels along the fill valve wire 1612 to its destination: the lubricant fill valve 1606. The preferred means for controlling lubricant volume within the die employs computational and electrical means. The means for controlling lubricant volume is capable of determining the amount of lubricant needed to issue though the valve to fill the die cavity 951. This measuring might be accomplished by measuring the time that the valve needs to remain in an open position, the volume of lubricant that passes through the valve, or the weight of the needed amount of lubricant. In measuring the volume of lubricant, the fill valve wire 1612 would have bi-directional electrical transfer capabilities to allow the fill valve 1606 to signal to the means for controlling lubricant volume 1610 when the proper amount of lubricant has passed. In cases of measuring lubricant weight, it would be advantageous to employ scale means (not shown) that measure the weight of the lubricant and a separate lubricant dispensing mechanism (not shown) to pour fluid into the lubricant source 1604. Other measurement techniques are abundant and any relevant measurement method known to those skilled in the art is applicable here. When the correct weight of lubricant is poured into the lubricant source, the means for controlling lubricant volume would signal the separate lubricant dispensing mechanism to stop and signal the lubricant fill valve 1606 to open. Lubricant leaving the lubricant source 1604 pours into a lubricant fill conduit 1616.

The lubricant fill conduit 1616 need not be complicated mechanism. In its most simple form, it is a mere pipe. Any pipe capable of receiving the needed lubricant will suffice. The preferred lubricant fill conduit 1616 begins at the fill valve 1606 and enters the die holder cylinder 320, passes through the die and culminates in a lubricant fill egress 1620. The path of the lubricant fill conduit is not an important aspect of the present invention. The path has but two requirements: one end of the lubricant fill conduit is positioned to receive a lubricant, and the other end is positioned to eject lubricant into the die cavity 951. The lubricant fill egress 1620 is hole through which lubricant passes into the die cavity. The type of lubricant fill egress 1620 used may vary widely. The lubricant fill egress 1620 shown in FIG. 12A projects slightly beyond the die 310 to form a spout. Another versions of the lubricant fill egress 1620 might be a simple aperture in the die 310 wall, having no projection. Such a projectionless lubricant fill egress would be preferred to prevent it from being in the path of moving press parts—for example the second upper punch face (not shown) as illustrated in FIG. 4.

For exemplary purpose, the aforementioned lubrication delivery utilized a single lubrication source 1604, a single lubrication fill conduit 1616, a single lubricant fill valve 1606, and a single lubricant fill egress 1620. Other embodiments can include multiple lubrication sources having multiple lubricant fill valves with multiple connecting fill conduits ending in multiple lubricant fill egresses about an inner perimeter of the die or multi-numerical combinations thereof—for example a single fill conduit having many fill egresses about the die, i.e. a manifold arrangement. Similarly, the means for controlling lubricant volume might comprise a single unit or multiple units.

Figure 13B:
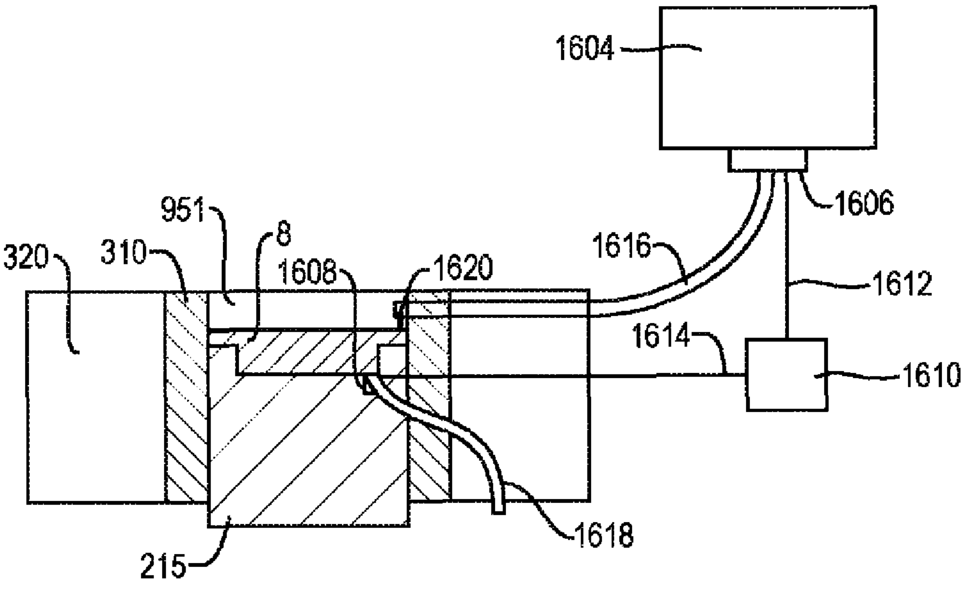
FIG. 13B is a schematic view of the preferred means for controlling the lubrication of the die cavity exhibiting a filling process.

As shown in FIG. 13B, lubricant 8 passing through the lubricant fill egress 1620 pools in the die cavity 951. The height at which the lubricant 8 fills is determined by the size of the press components. The preferred pour fills the entire die cavity with lubricant before draining. Once the press's internal structure is sufficiently lubricated, the means for controlling lubricant volume 1610 signals the lubricant drain valve 1608 to open.

The method that the means for controlling lubricant volume uses to determine the correct volume of lubricant may vary. The means for controlling lubricant volume may include scale means (not shown) to measure the weight of the lubricant, which upon registering the needed weight signals the lubricant drain valve to open. Additionally, the means for controlling lubricant volume may include timing means that knows the time required for lubricant to travel the path from the lubricant source, to the die cavity and to pool therein. Other measurement techniques are abundant and would be obvious to those skilled the art. Communication with the means for controlling lubricant volume may occur via a drain valve wire 1614. A preferred drain valve wire 1614 includes means for bi-directional signal transfer and connects the means for controlling lubricant volume 1610 to the lubricant drain valve 1608.

When the die is properly lubricated, the means for controlling lubricant volume 1610 signals the lubricant drain valve 1608 to open. Lubricant drains from the die cavity 951 through the open drain valve 1608 into the drain valve conduit

1618, which conducts the used lubricant from the press system. The preferred embodiment of the present invention includes a screen (not shown) in the drain valve 1608 or the drain valve conduit 1618. The preferred screen is sized to prevent particles from the die cavity from exiting along with the used lubricant. When embodiments utilize a stationary second punch 215, the drain valve conduit 1608 may pass through the second lower punch 215, through the die 310 and past the die holder cylinder 320. The path of the drain valve conduit 1618 is irrelevant except for two points: the drain valve conduit must be positioned to receive used lubricant from the die cavity 951 and positioned to expel lubricant from the press system (or into some secondary holding container). With these two positions in mind, the drain valve conduit 1618 may completely travel through the second punch 215 into a second end plate (not shown here) without ever having passed through the die 310. It should be known that the present invention might include multiple drain valves and drain valve conduits; the number is a matter of preference. The path variations are many, as additional embodiments of the present invention contain many components to either avoid or tunnel through. Additionally, the drain valve may be positioned on a surface of a punch 215, on the inner wall of the die 310, or some alternate location effective to drain lubricant. The path represented by the FIGS. 13A and 13B should not limit the orientations of the components of the means for controlling die cavity lubrication 1602 as the pictured embodiment is a simplistic representation of a single embodiment presented to teach rather than to cover all conceivable component positions, shapes and numbers.

A key component of the means for controlling die cavity lubrication 1602, the means for controlling lubricant volume 1610 within the die preferably includes a computer having a processor and a memory onto which is stored a computer program that includes computer program means for sending an output to a means for controlling a position of one or more workpiece-forming punches to move at least one workpiece-forming punch such that an enclosed die cavity is formed, computer program means for controlling the lubricant fill valve 1606 such that lubricant is introduced into the die, and computer program means for controlling the lubricant drain valve 1608 to drain the lubricant from the die. In some embodiments of the invention, the computer program means for forming an enclosed die cavity also includes a means for moving one or more of the punches after the die is filled with lubricant to insure that all surfaces in need of lubrication are lubricated.

In preferred steps for lubricating interior components of a press, punches are first moved to a known orientation: a first position. The first position creates an arbitrary standard that allows the means for controlling lubricant volume to know the volume of lubricant needed to fill the die cavity and expose sections of the die wall. In some embodiments, the first position places the first punch in an orientation to create a ceiling for the die cavity. While the press components rest in the first position, lubricant is introduced. After introducing the lubricant, the punches move two a second position effective to expose other sections of the die wall. After the die has been sufficiently lubricated, the lubricant is drained from the die and the punches are set in a press position ready to accept introduction of powder—that is, if the punches are not in that position already. The specifics of performing these steps should be ready ascertainable to those skilled in the art when read in conjunction with the description of FIGS. 13A, 13B and other relevant sections herein.

The preferred lubricant is the commercially available lubricant marketed by Miller Stephenson as PTFE Mold Release Agent for Hot Molds. Lubricants having fluorocarbons work well to lubricate the die cavity as they permit cold-lubing. Unfortunately, fluorocarbons are environmentally questionable. Water-based fluorocarbons work well but require the additional step of heating. The preferred temperature of the water-based fluorocarbons used in lubrications in embodiments of the present invention is between about 125-135° C. Use of lubricants that operate effectively at lower temperatures is important. Hydraulic fluids are often volatile and will not tolerate harsh temperatures. Additionally, it is found that the water-based fluorocarbons needs only a single fill cycle to properly lubricate.

Figure 14:
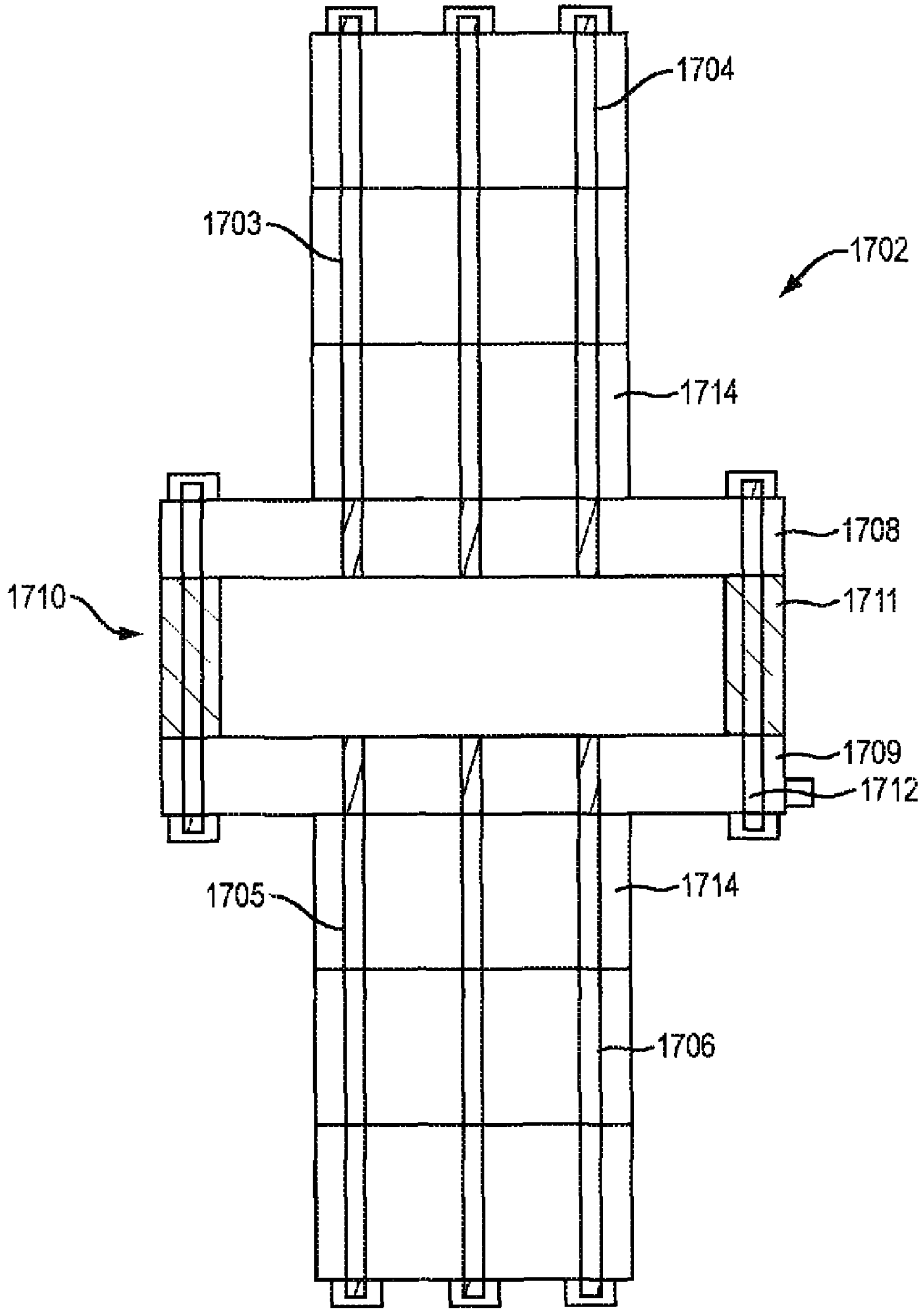
FIG. 14 is a schematic view of an open-die press system of the present invention.

Now turning to FIG. 14, another embodiment of the press system 1702 of the present invention is shown. In this embodiment, the press system 1702 includes a top portion 1703 and a bottom portion 1705, which are aligned with, and attach to, the central die portion 1710 via top plate 1708 and bottom plate 1709. As was the case with the other embodiments of the system described herein, the top portion 1703 and bottom portion 1705 are made up of a plurality of piston cylinders 1714, which house the pistons and workpiece forming punches (not shown). However, rather than connecting all of these piston cylinders 1714 and the die portion 1710 together via a single group of long bolts, the top portion 1702 and bottom portion 1705 are instead separated and independently attached via a first set of bolts 1704 and a second set of bolts 1706. These sets of bolts 1704, 1706 are secured to the top plate 1708 and bottom plate 1709 of the die 1710 via precisely aligned tapped holes in each plate 1708, 1709, and the top plate 1708, 1709 are subsequently attached together via spacers 1711 and two additional sets of bolts 1712. In all cases, the preferred bolts 1704, 1706, 1712 are the same pretensioned bolts utilized in other embodiments of the invention, and are preferably of the type manufactured by the Superbolt Company.

The system 1702 of FIG. 14 is advantageous as it allows the size of the part to be produced to be increased over those that could be otherwise made using other embodiments of the system, and are particularly advantageous in application involving secondary operations to be performed of pre-manufactured parts. For example, a car door could be inserted into the die portion 1710 of this embodiment of the system 1702 and various details punched or formed into the car door. However, this system 1702 could also be used along with extended forming punches to produce the entire car door itself and, therefore, should not be seen as being so limited.

In its most basic form, the method of the present invention includes the steps of controlling an introduction of a powder material into a die, controlling a creation of a substantially uniform distribution of powder material in the die, and controlling a pressing of the powder material in the die by controlling a magnitude of a pressing force applied by each of at least one set of workpiece-forming punches and by controlling a position of each set of workpiece-forming punches relative to the die.

The preferred computer program product comprises a plurality of mode commands provided in G-code to the controllers described above, and which directly control the various parts of the system.

In operation, the control system performs a number of steps, which effectively control the operation of the press. In the preferred method, the step of controlling an introduction of the powder material comprises the step of controlling a weight and temperature of the powder material introduced into the die. In some embodiments, the step of controlling the weight of the powder material introduced into the die includes the steps of controlling a weight of a first powder material to be introduced into the die and controlling a weight of a second powder material to be introduced into the die. The preferred step of controlling a creation of a substantially uniform distribution of powder material in the die comprises controlling a fluidization of the powder material within the die.

The pressing of the powder material in the die is preferably controlled by controlling a magnitude of a pressing force applied by each set of workpiece-forming punches by controlling a pressure of a fluid provided to each of at least one piston that is operatively associated with each set of workpiece-forming punches. This pressure control step preferably includes the steps of determining a pressure of the fluid provided to each of at least one piston that is operatively associated with each set of workpiece-forming punches, comparing the pressure of the fluid provided to each piston to a pressure corresponding to a desired pressing force, and adjusting the pressure of the fluid provided to each piston based upon a result of the comparing step. In some embodiments, the step of adjusting the pressure of the fluid provided to each piston includes adjusting the pressure of the fluid provided to each piston such that the workpiece-forming punches form a workpiece having a substantially uniform density.

The preferred step of controlling pressing of the powder material in the die by controlling a position of each set of workpiece-forming punches relative to the die includes the steps of determining a position of each set of workpiece-forming punches, comparing the position of each set of workpiece-forming punches to a desired position, and adjusting a rate of travel of each set of workpiece-forming punches based upon a result of the comparing step. This step preferably also includes the steps of controlling a position of a first set of workpiece-forming punches moving in a first direction relative to the die, and controlling a second set of workpiece forming punches moving in a second direction relative to the die.

The preferred method also includes the step of controlling a lubrication of the die cavity prior to controlling the introduction of powder material into the die. This step preferably includes the steps of creating an enclosed die cavity, introducing a lubricant into the die cavity, and draining the lubricant from the die cavity.

It is envisioned that the computer program means described in connection with the control system, and adapted for performing the steps of the method, will be sold as a separate press control program product. Such a computer program product is adapted to allow a single computer to direct all of the control functions described herein. In some embodiments, a single computer may direct these functions for multiple presses running concurrently. Finally, it is envisioned that articles of manufacture, taking the form of data storage media onto which the relevant data structures are stored.

While the present invention has been described with reference to embodiments thereof, it is to be understood that the invention is not limited to the described embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A method for controlling a powder press, the method comprising the steps of:

introducing a powder material into a die;

creating a substantially uniform distribution of powder material in the die by fluidization of the powder as the powder enters the die;

pressing of the powder material in the die by controlling a pressure of a fluid provided to each of at least one piston that is operatively associated with each set of workpiece-forming punches therein controlling a magnitude of a pressing force applied by each set of workpiece-forming punches including the steps of:

determining a pressure of a fluid provided to each of at least one piston that is operatively associated with each set of workpiece-forming punches, comparing using at least one pressure sensor and a processor the pressure of the fluid provided to each piston to a pressure corresponding to a desired pressing force, and adjusting the pressure of the fluid provided to each piston based upon a result of the comparing step; and controlling a position of each set of workpiece-forming punches relative to the die using a position sensor and the processor.

2. A method as claimed in claim 1 wherein the step of introducing the powder material comprises the step of controlling a weight of the powder material introduced into the die.

3. The method as claimed in claim 2 wherein the step of controlling the weight of the powder material introduced into the die comprises the steps of controlling a weight of a first powder material to be introduced into the die and controlling a weight of a second powder material to be introduced into the die.

4. A method as claimed in claim 1 wherein the step of introducing the powder material comprises the step of controlling a temperature of the powder material to be introduced into the die.

5. The method as claimed in claim 1 further comprising the step of heating a pressurized gas used to fluidize the powder material within the die.

6. The method as claimed in claim 1 wherein the step of adjusting the pressure of the fluid provided to each piston comprises adjusting the pressure of the fluid provided to each piston such that the workpiece-forming punches form a workpiece having a substantially uniform density.

7. A method as claimed in claim 1 wherein the step of controlling the pressing of the powder material in the die further comprises controlling positioning a first set of workpiece-forming punches relative to the die by controlling the position using a position sensor and the processor, and positioning a second set of workpiece forming punches relative to the die by controlling the position using a position sensor and the processor.

8. A method as claimed in claim 1 wherein said step of controlling the pressing of the powder material in the die comprises controlling the pressing of the powder material such that a finished part does not crack upon ejection, said controlling comprising the steps of:

pressing the powder material to a desired position; and gradually reducing the pressing force applied by each of at least one set of workpiece-forming punches while maintaining the workpiece forming punches in a substantially fixed position such that the finished part is fully supported at all times prior to ejection; and ejecting the finished part.

9. A method for controlling a powder press, the method comprising the steps of:

introducing a powder material into a die by measuring the feed of powder material onto a scale controlled by a controller for introduction into the die;

creating a substantially uniform distribution of powder material in the die by fluidization of the powder as the powder enters the die;

pressing of the powder material in the die by controlling a pressure of a fluid provided to each of at least one piston that is operatively associated with each set of workpiece-forming punches therein controlling a magnitude of a pressing force applied by each of at least one set of workpiece-forming punches; and by controlling a position of each set of workpiece-forming punches relative to the die including the steps of:

determining a position of each set of workpiece-forming punches, comparing using a position sensor and the controller the position of each set of workpiece-forming punches to a desired position, and adjusting a rate of travel of each set of workpiece-forming punches based upon a result of the comparing step.

10. A method for controlling a powder press, said method comprising the steps of:

lubricating the die cavity;

introducing a powder material into a die;

creating a substantially uniform distribution of powder material in the die by fluidization of the powder as the powder enters the die; and pressing of the powder material in the die by controlling a magnitude of a pressing force applied by each of at least one set of workpiece-forming punches by determining a pressure of a fluid provided to each of at least one piston that is operatively associated with each set of workpiece-forming punches, comparing using at least one pressure sensor and a processor the pressure of the fluid provided to each piston to a pressure corresponding to a desired pressing force, and adjusting the pressure of the fluid provided to each piston based upon a result of the comparing step and by controlling a position of each set of workpiece-forming punches relative to the die using at least one position sensor and the processor.

11. The method as claimed in claim 10 wherein the step of adjusting the pressure of the fluid provided to each piston comprises adjusting the pressure of the fluid provided to each piston such that the workpiece-forming punches form a workpiece having a substantially uniform density.

12. The method as claimed in claim 10 wherein said step of lubricating of the die cavity comprises the steps of:

creating an enclosed die cavity;

introducing a lubricant into the die cavity; and draining the lubricant from the die cavity.

* * * * *